United States Patent
Di et al.

(10) Patent No.: US 10,462,518 B2
(45) Date of Patent: Oct. 29, 2019

(54) IMAGE PRESENTATION METHOD, TERMINAL DEVICE, AND SERVER

(71) Applicant: Huawei Technologies Co., Ltd., Shenzhen (CN)

(72) Inventors: Peiyun Di, Shenzhen (CN); Xin Liu, Shenzhen (CN); Changquan Ai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 15/467,486

(22) Filed: Mar. 23, 2017

(65) Prior Publication Data
US 2017/0195727 A1    Jul. 6, 2017

Related U.S. Application Data

(63) Continuation of application No. PCT/CN2015/077678, filed on Apr. 28, 2015.

(30) Foreign Application Priority Data

Sep. 24, 2014    (CN) .......................... 2014 1 0494921

(51) Int. Cl.
H04N 21/437    (2011.01)
H04N 21/4402    (2011.01)
(Continued)

(52) U.S. Cl.
CPC . H04N 21/440263 (2013.01); H04N 5/23206 (2013.01); H04N 5/23238 (2013.01);
(Continued)

(58) Field of Classification Search
CPC .............. H04N 21/2187; H04N 5/247; H04N 21/41407; H04N 21/4263
(Continued)

(56) References Cited

U.S. PATENT DOCUMENTS 10,129,569 B2 * 11/2018 Ortiz .................. A63B 71/06
2012/0133639 A1    5/2012 Kopf et al.
(Continued)

FOREIGN PATENT DOCUMENTS

CN    101795306 A    8/2010
CN    103971399 A    8/2014
(Continued)

OTHER PUBLICATIONS

Machine Translation and Abstract of Chinese Publication No. CN101795306, Aug. 4, 2010, 10 pages.
(Continued)

*Primary Examiner* — Anand S Rao
(74) *Attorney, Agent, or Firm* — Conley Rose, P.C.

(57) ABSTRACT

An image presentation method, where the method includes obtaining identification information of a first object when a switching instruction for switching the first object to a second object is received, where one of the first object or the second object is a first 360-degree panorama, the other is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, and the first 360-degree panorama is one of the multiple 360-degree panoramas, obtaining, according to the identification information of the first object, the second object corresponding to the identification information of the first object, and presenting the second object.

26 Claims, 9 Drawing Sheets

(51) Int. Cl.
*H04N 5/232* (2006.01)
*H04N 5/44* (2011.01)
*H04N 7/01* (2006.01)
*H04N 21/258* (2011.01)
*H04N 21/44* (2011.01)
*H04N 21/472* (2011.01)

(52) U.S. Cl.
CPC ....... *H04N 5/23293* (2013.01); *H04N 5/4403* (2013.01); *H04N 7/0117* (2013.01); *H04N 21/25841* (2013.01); *H04N 21/437* (2013.01); *H04N 21/44016* (2013.01); *H04N 21/47202* (2013.01)

(58) Field of Classification Search
USPC ..................................................... 348/36–39
See application file for complete search history.

(56) References Cited

U.S. PATENT DOCUMENTS

| | | |
|---|---|---|
| 2012/0293608 A1 | 11/2012 | Doepke et al. |
| 2012/0293609 A1 | 11/2012 | Doepke et al. |
| 2012/0294549 A1 | 11/2012 | Doepke |
| 2014/0240311 A1 | 8/2014 | Xu et al. |
| 2017/0195727 A1 | 7/2017 | Di et al. |

FOREIGN PATENT DOCUMENTS

| | | |
|---|---|---|
| CN | 104023203 A | 9/2014 |
| CN | 104301769 A | 1/2015 |
| JP | 2004297298 A | 10/2004 |

OTHER PUBLICATIONS

Machine Translation and Abstract of Chinese Publication No. CN104023203, Sep. 3, 2014, 14 pages.
Machine Translation and Abstract of Japanese Publication No. JP2004297298, Oct. 21, 2004, 12 pages.
Machine Translation and Abstract of Chinese Publication No. CN104301769, Jan. 21, 2015, 31 pages.
Foreign Communication From a Counterpart Application, PCT Application No. PCT/CN2015/077678, English Translation of International Search Report dated Jul. 1, 2015, 2 pages.
Foreign Communication From a Counterpart Application, PCT Application No. PCT/CN2015/077678, English Translation of Written Opinion dated Jul. 1, 2015, 8 pages.

* cited by examiner

100

Obtain identification information of a first object when a switching instruction for switching the displayed first object to a second object is received, where one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, where i and j are positive integer ~ 110

Obtain, according to the identification information of the first object, the second object corresponding to the identification information of the first object, where there is a correspondence between the identification information of the first object and identification information of the second object ~ 120

Present the second object ~ 130

FIG. 1

IMAGE PRESENTATION METHOD, TERMINAL DEVICE, AND SERVER

CROSS-REFERENCE TO RELATED APPLICATIONS

This application is a continuation of International Patent Application No. PCT/CN2015/077678 filed on Apr. 28, 2015, which claims priority to Chinese Patent Application No. 201410494921.8 filed on Sep. 24, 2014. The disclosures of the aforementioned applications are hereby incorporated by reference in their entireties.

TECHNICAL FIELD

The present disclosure relates to the field of information technologies, and in particular, to an image presentation method, a terminal device, and a server.

BACKGROUND

A 360-degree panoramic camera can shoot a 360-degree panoramic video. A user may watch a 360-degree landscape around a point by watching the 360-degree panoramic video, and may watch a streetscape of a whole street by watching a streetscape image. However, the user cannot switch to the streetscape image at a street side while watching the 360-degree panoramic video, or switch to the 360-degree panoramic video while watching a place in the streetscape image and that the user is interested in.

SUMMARY

Embodiments of the present disclosure provide an image presentation method in order to flexibly switch between a 360-degree panorama and a strip panorama and to enrich visual experience of a user.

According to a first aspect, an image presentation method is provided, and the method includes obtaining identification information of a first object when a switching instruction for switching the displayed first object to a second object is received, where one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers, obtaining, according to the identification information of the first object, the second object corresponding to the identification information of the first object, where there is a correspondence between the identification information of the first object and identification information of the second object, and presenting the second object.

With reference to the first aspect, in a first possible implementation manner, after obtaining identification information of a first object, the method further includes determining the identification information of the second object corresponding to the identification information of the first object, and sending first request information to a server to request the second object, where the first request information includes the identification information of the second object, and obtaining the second object corresponding to the identification information of the first object includes receiving the second object sent by the server.

With reference to the first aspect, in a second possible implementation manner, after obtaining the identification information of a first object, the method further includes sending second request information to a server to request the second object, where the second request information includes the identification information of the first object such that the server determines the identification information of the second object according to the identification information of the first object, and determines the second object according to the identification information of the second object, and obtaining the second object corresponding to the identification information of the first object includes receiving the second object sent by the server.

With reference to the first aspect, in a third possible implementation manner, obtaining, according to the identification information of the first object, the second object corresponding to the identification information of the first object includes determining the identification information of the second object corresponding to the identification information of the first object, and obtaining the second object according to the identification information of the second object.

With reference to the third possible implementation manner, in a fourth possible implementation manner, the multiple 360-degree panoramas are multiple 360-degree panoramic video frames in a 360-degree panoramic video, and the 360-degree panoramic video is shot using a 360-degree panoramic camera along an extension direction of a road on which the first region is located, before obtaining identification information of a first object, the method further includes obtaining the 360-degree panoramic video, where a $j^{th}$ 360-degree panoramic video frame in the multiple 360-degree panoramic video frames includes the front image used to display the $i^{th}$ sub-region in the first region, capturing, from the $j^{th}$ 360-degree panoramic video frame in the multiple 360-degree panoramic video frames, the front image used to display the $i^{th}$ sub-region in the first region, splicing, into the first strip panorama, front images that are captured from the multiple 360-degree panoramic video frames and used to display multiple sub-regions in the first region, and establishing a correspondence between identification information of the first strip panorama and identification information of a first 360-degree panoramic video frame in the multiple 360-degree panoramic video frames.

With reference to the fourth possible implementation manner, in a fifth possible implementation manner, the capturing, from the $j^{th}$ 360-degree panoramic video frame in the multiple 360-degree panoramic video frames, the front image used to display the $i^{th}$ sub-region in the first region includes determining a first direction of the $i^{th}$ sub-region in the first region and along which the $j^{th}$ 360-degree panoramic video frame in the 360-degree panoramic video is shot, determining a second direction that forms a 90-degree included angle with the first direction, and capturing, from the $j^{th}$ 360-degree panoramic video frame in the 360-degree panoramic video, a front image shot in the second direction and used to display the $i^{th}$ sub-region in the first region.

With reference to any one of the first aspect or the first to the fifth possible implementation manners, in a sixth possible implementation manner, the first object is the first 360-degree panorama, the second object is the first strip panorama, and after a switching instruction for switching the displayed first 360-degree panorama to the first strip panorama is received, the method further includes obtaining display resolution of a device presenting the first strip panorama, obtaining, according to the identification information of the first object, the second object corresponding to the identification information of the first object includes obtaining, according to the identification information of the first 360-degree panorama and the display resolution, multiple consecutive strip panoramas that include the first strip panorama, where the multiple strip panoramas form a second strip panorama of a second region in which the first region is located, and presenting the second object includes presenting, according to identification information of the multiple strip panoramas, the second strip panorama formed by splicing the multiple strip panoramas.

With reference to any one of the first aspect or the first to the sixth possible implementation manners, in a seventh possible implementation manner, the identification information of the first object and the identification information of the second object are denoted by time information or geographic location information of shooting the first 360-degree panorama.

According to a second aspect, an image presentation method is provided, and the method includes receiving request information sent by a terminal device and used for requesting a second object, where the request information includes identification information of a first object, one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers, determining, according to the identification information of the first object, identification information of the second object corresponding to the identification information of the first object, determining the second object according to the identification information of the second object, and sending the second object to the terminal device such that the terminal device presents the second object.

With reference to the second aspect, in a first possible implementation manner of the second aspect, the multiple 360-degree panoramas are multiple 360-degree panoramic video frames in a 360-degree panoramic video, and the 360-degree panoramic video is shot using a 360-degree panoramic camera along an extension direction of a road on which the first region is located, before determining, according to the identification information of the first object, identification information of the second object corresponding to the identification information of the first object, the method further includes obtaining the 360-degree panoramic video, where a $j^{th}$ 360-degree panoramic video frame in the multiple 360-degree panoramic video frames includes the front image used to display the $i^{th}$ sub-region in the first region, capturing, from the $j^{th}$ 360-degree panoramic video frame in the multiple 360-degree panoramic video frames, the front image used to display the $i^{th}$ sub-region in the first region, splicing, into the first strip panorama, front images that are captured from the multiple 360-degree panoramic video frames and used to display multiple sub-regions in the first region, and establishing a correspondence between identification information of the first strip panorama and identification information of a first 360-degree panoramic video frame in the multiple 360-degree panoramic video frames.

With reference to the first possible implementation manner of the second aspect, in a second possible implementation manner of the second aspect, capturing, from the $j^{th}$ 360-degree panoramic video frame in the multiple 360-degree panoramic video frames, the front image used to display the $i^{th}$ sub-region in the first region includes determining a first direction of the $i^{th}$ sub-region in the first region and along which the $j^{th}$ 360-degree panoramic video frame in the 360-degree panoramic video is shot, determining a second direction that forms a 90-degree included angle with the first direction, and capturing, from the $j^{th}$ 360-degree panoramic video frame in the 360-degree panoramic video, a front image shot in the second direction and used to display the $i^{th}$ sub-region in the first region.

With reference to the second aspect or the first or second possible implementation manner of the second aspect, in a third possible implementation manner of the second aspect, the first object is the first 360-degree panorama, the second object is the first strip panorama, and the request information further includes display resolution of the terminal device. After the first strip panorama corresponding to the identification information of the first strip panorama is determined, the method further includes determining, according to the display resolution, multiple consecutive strip panoramas that include the first strip panorama, where the multiple strip panoramas form a second strip panorama of a second region in which the first region is located, and sending the second object to the terminal device includes sending the multiple strip panoramas to the terminal device such that the terminal device presents the second strip panorama formed by splicing the multiple strip panoramas.

With reference to any one of the second aspect or the first to the third possible implementation manners of the second aspect, in a fourth possible implementation manner of the second aspect, the identification information of the first object and the identification information of the second object are denoted by time information or geographic location information of shooting the first 360-degree panorama.

According to a third aspect, a terminal device is provided and includes an obtaining module configured to obtain identification information of a first object when a switching instruction for switching the displayed first object to a second object is received, where one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers, where the obtaining module is further configured to obtain, according to the identification information of the first object, the second object corresponding to the identification information of the first object, where there is a correspondence between the identification information of the first object and identification information of the second object, and a display module configured to present the second object.

With reference to the third aspect, in a first possible implementation manner of the third aspect, the terminal device further includes a first determining module configured to determine the identification information of the second object corresponding to the identification information of the first object after the obtaining module obtains the identification information of the first object, and a first sending module configured to send first request information to a server to request the second object, where the first request information includes the identification information of the second object, and the obtaining module is further configured to receive the second object sent by the server.

With reference to the third aspect, in a second possible implementation manner of the third aspect, the method further includes a second sending module configured to send second request information to a server to request the second object after the obtaining module obtains the identification information of the first object, where the second request information includes the identification information of the first object such that the server determines the identification information of the second object according to the identification information of the first object, and determines the second object according to the identification information of the second object, and the obtaining module is further configured to receive the second object sent by the server.

With reference to the third aspect, in a third possible implementation manner of the third aspect, the terminal device further includes a second determining module configured to determine the identification information of the second object corresponding to the identification information of the first object, and the obtaining module is further configured to obtain the second object according to the identification information of the second object.

With reference to the third possible implementation manner of the third aspect, in a fourth possible implementation manner of the third aspect, the multiple 360-degree panoramas are multiple 360-degree panoramic video frames in a 360-degree panoramic video, and the 360-degree panoramic video is shot using a 360-degree panoramic camera along an extension direction of a road on which the first region is located. The obtaining module is further configured to obtain the 360-degree panoramic video before obtaining the identification information of the first object, where a $j^{th}$ 360-degree panoramic video frame in the multiple 360-degree panoramic video frames includes the front image used to display the $i^{th}$ sub-region in the first region, and the terminal device further includes a capturing module configured to capture, from the $j^{th}$ 360-degree panoramic video frame in the multiple 360-degree panoramic video frames, the front image used to display the $i^{th}$ sub-region in the first region, a splicing module configured to splice, into the first strip panorama, front images that are captured from the multiple 360-degree panoramic video frames and used to display multiple sub-regions in the first region, and a relationship module configured to establish a correspondence between identification information of the first strip panorama and identification information of a first 360-degree panoramic video frame in the multiple 360-degree panoramic video frames.

With reference to the fourth possible implementation manner of the third aspect, in a fifth possible implementation manner of the third aspect, the second determining module is further configured to determine a first direction of the $i^{th}$ sub-region in the first region and along which the $j^{th}$ 360-degree panoramic video frame in the 360-degree panoramic video is shot, and determine a second direction that forms a 90-degree included angle with the first direction, and the capturing module is further configured to capture, from the $j^{th}$ 360-degree panoramic video frame in the 360-degree panoramic video, a front image shot in the second direction determined by the second determining module and displays the $i^{th}$ sub-region in the first region.

With reference to any one of the third aspect or the first to the fifth possible implementation manners of the third aspect, in a sixth possible implementation manner of the third aspect, the first object is the first 360-degree panorama, and the second object is the first strip panorama. The obtaining module is further configured to obtain display resolution of a device presenting the first strip panorama after a switching instruction for switching the displayed first 360-degree panorama to the first strip panorama is received. The obtaining module is further configured to obtain, according to the identification information of the first 360-degree panorama and the display resolution, multiple consecutive strip panoramas that include the first strip panorama, where the multiple strip panoramas form a second strip panorama of a second region in which the first region is located, and the display module is further configured to present, according to identification information of the multiple strip panoramas, the second strip panorama formed by splicing the multiple strip panoramas.

With reference to any one of the third aspect or the first to the sixth possible implementation manners of the third aspect, in a seventh possible implementation manner of the third aspect, the identification information of the first object and the identification information of the second object are denoted by time information or geographic location information of shooting the first 360-degree panorama.

According to a fourth aspect, a server is provided, and the server includes a receiving module configured to receive request information sent by a terminal device and used for requesting a second object, where the request information includes identification information of a first object, one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers, a determining module configured to determine, according to the identification information of the first object, identification information of the second object corresponding to the identification information of the first object, where the determining module is further configured to determine the second object according to the identification information of the second object, and a sending module configured to send the second object to the terminal device such that the terminal device presents the second object.

With reference to the fourth aspect, in a first possible implementation manner of the fourth aspect, the multiple 360-degree panoramas are multiple 360-degree panoramic video frames in a 360-degree panoramic video, the 360-degree panoramic video is shot using a 360-degree panoramic camera along an extension direction of a road on which the first region is located, and the server further includes an obtaining module configured to obtain the 360-degree panoramic video before the determining module determines the identification information of the second object corresponding to the identification information of the first object, where a $j^{th}$ 360-degree panoramic video frame in the multiple 360-degree panoramic video frames includes the front image used to display the $i^{th}$ sub-region in the first region, a capturing module configured to capture, from the $j^{th}$ 360-degree panoramic video frame in the multiple 360-degree panoramic video frames, the front image used to display the $i^{th}$ sub-region in the first region, a splicing module configured to splice, into the first strip panorama, front images that are captured from the multiple 360-degree panoramic video frames and used to display multiple sub-regions in the first region, and a relationship module configured to establish a correspondence between identification information of the first strip panorama and identification information of a first 360-degree panoramic video frame in the multiple 360-degree panoramic video frames.

With reference to the first possible implementation manner of the fourth aspect, in a second possible implementation manner of the fourth aspect, the determining module is further configured to determine a first direction of the $i^{th}$ sub-region in the first region and along which the $j^{th}$ 360-degree panoramic video frame in the 360-degree panoramic video is shot, and determine a second direction that forms a 90-degree included angle with the first direction, and the capturing module is further configured to capture, from the $j^{th}$ 360-degree panoramic video frame in the 360-degree panoramic video, a front image shot in the second direction and used to display the $i^{th}$ sub-region in the first region.

With reference to the fourth aspect or the first or second possible implementation manner of the fourth aspect, in a third possible implementation manner of the fourth aspect, the first object is the first 360-degree panorama, the second object is the first strip panorama, and the request information further includes display resolution of the terminal device. The determining module is further configured to determine, according to the display resolution, multiple consecutive strip panoramas that include the first strip panorama after the determining module determines the first strip panorama corresponding to the identification information of the first strip panorama, where the multiple strip panoramas form a second strip panorama of a second region in which the first region is located, and the sending module is further configured to send the multiple strip panoramas to the terminal device such that the terminal device presents the second strip panorama formed by splicing the multiple strip panoramas.

With reference to the fourth aspect or the first or second or third possible implementation manner of the fourth aspect, in a fourth possible implementation manner of the fourth aspect, the identification information of the first object and the identification information of the second object are denoted by time information or geographic location information of shooting the first 360-degree panorama.

Based on the foregoing technical solutions, a 360-degree panorama and a strip panorama can be flexibly switched according to a correspondence between identification information of the 360-degree panorama and identification information of the strip panorama such that visual experience of a user can be enriched.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 1 is a schematic flowchart of an image presentation method according to an embodiment of the present disclosure;

DESCRIPTION OF EMBODIMENTS

Figure 2:
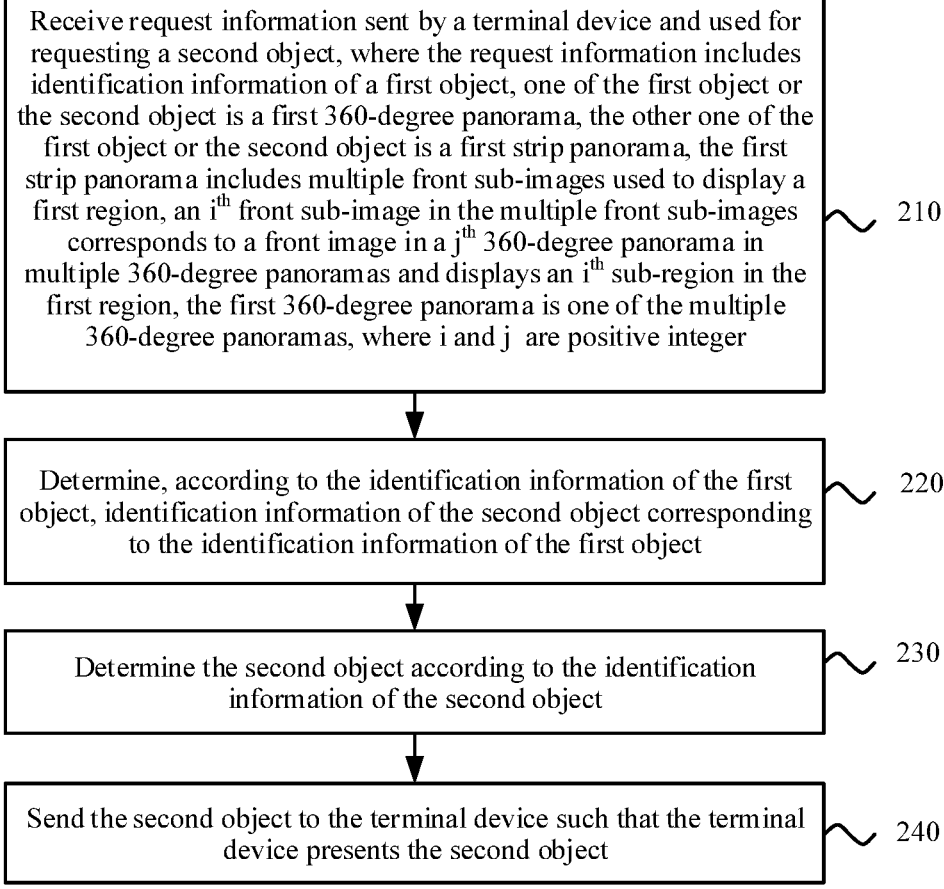
FIG. 2 is a schematic flowchart of an image presentation method according to another embodiment of the present disclosure.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

A 360-degree panorama refers to an image, obtained around a fixed viewpoint, of 360 degrees around the viewpoint. A strip panorama refers to a wide-angle-of-view image obtained by splicing narrow-angle-of-view images that are of multiple viewpoints and that are continuously shot.

FIG. 1 shows a schematic flowchart of an image presentation method 100 according to an embodiment of the present disclosure. The method 100 may be performed by a terminal device. As shown in FIG. 1, the method 100 includes the following content.

Step 110: Obtain identification information of a first object when a switching instruction for switching the displayed first object to a second object is received, where one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, where i and j are positive integers.

The first strip panorama may be a panoramic image of a road side. In this case, the first strip panorama may be referred to as a streetside panorama. The strip panorama may be obtained by rectifying and splicing multiple planar images that are consecutively collected, or may be obtained by splicing narrow image regions that are captured from multiple 360-degree panoramas consecutively collected by a 360-degree panoramic camera and display a streetside region.

In this embodiment of the present disclosure, i may be the same as j. In this case, the multiple 360-degree panoramas correspond one-to-one to multiple sub-regions in the first region. That is, the multiple 360-degree panoramas are separately corresponding to different geographic locations. Alternatively, i may be different from j. For example, a third 360-degree panorama corresponds to a second sub-region in the first region, and the first 360-degree panorama and a second 360-degree panorama are corresponding to a first sub-region in the first region. This is because the 360-degree panoramic camera stops moving in a shooting process and consecutively shoots more than one 360-degree panorama of a same region (such as the first sub-region) at a same location, or because the 360-degree panoramic camera continues to shoot a same road section (for example, the first sub-region) when retracing an original route in a shooting process. Consequently, more than one 360-degree panorama corresponds to a same geographic location.

Step 120: Obtain, according to the identification information of the first object, the second object corresponding to the identification information of the first object, where there is a correspondence between the identification information of the first object and identification information of the second object.

The identification information of the first object and the identification information of the second object can indicate a correspondence between the first object and the second object. The identification information of the first object and the identification information of the second object may be stored in respective description files. The description file of the first object and the description file of the second object may further include respective description information, for example, time information of shooting an image, image width information, and image azimuth information. Alternatively, the identification information of the first object and the identification information of the second object may be described in a same file. In the file, the correspondence between the identification information of the first object and the identification information of the second object may be reflected using time information or geographic location information, or the correspondence between the identification information of the first object and the identification information of the second object may be directly described in the file.

Step 130: Present the second object.

Therefore, according to the image presentation method in this embodiment of the present disclosure, a 360-degree panorama and a strip panorama can be flexibly switched according to a correspondence between identification information of the 360-degree panorama and identification information of the strip panorama such that visual experience of a user can be enriched.

In this embodiment of the present disclosure, the identification information of the first object and the identification information of the second object may be denoted by time information or geographic location information of shooting the first 360-degree panorama.

Further, the strip panorama and the 360-degree panorama may be identified by shooting time information recorded in a description file of the 360-degree panorama, or the strip panorama and the 360-degree panorama may be identified by shooting geographic location information recorded in a description file of the 360-degree panorama. For example, when the 360-degree panorama is a 360-degree panoramic video frame in a 360-degree panoramic video, the strip panorama may be directly identified by time information of the corresponding 360-degree panoramic video frame.

It should be understood that the identification information of the first object and the identification information of the second object may be denoted by a serial number of the first object and a serial number of the second object.

Further, the strip panorama and the 360-degree panorama may be identified by serial numbers. For example, file serial numbers that are in correspondence to each other may be used to identify the strip panorama and the 360-degree panorama.

Alternatively, in another embodiment, step 120 may include determining the identification information of the second object corresponding to the identification information of the first object, and obtaining the second object according to the identification information of the second object. In this embodiment of the present disclosure, the strip panorama, the 360-degree panorama, the identification information of the strip panorama, and the identification information of the 360-degree panorama are all stored on the terminal device. In this case, each local application or each local module of the terminal device may perform a process of switching between a streetside image and a 360-degree panoramic video.

Optionally, in another embodiment, the multiple 360-degree panoramas are multiple 360-degree panoramic video frames in a 360-degree panoramic video, and the 360-degree panoramic video is shot using a 360-degree panoramic camera along an extension direction of a road on which the first region is located. Before step 110, the method 100 may further include obtaining the 360-degree panoramic video, where a $j^{th}$ 360-degree panoramic video frame in the multiple 360-degree panoramic video frames includes the front image used to display the $i^{th}$ sub-region in the first region, capturing, from the $j^{th}$ 360-degree panoramic video frame in the multiple 360-degree panoramic video frames, the front image used to display the $i^{th}$ sub-region in the first region, splicing, into the first strip panorama, front images that are captured from the multiple 360-degree panoramic video frames and used to display multiple sub-regions in the first region, and establishing a correspondence between identification information of the first strip panorama and identification information of a first 360-degree panoramic video frame in the multiple 360-degree panoramic video frames.

In this embodiment of the present disclosure, a strip panorama is generated by splicing partial image regions captured from multiple consecutive frames in a 360-degree panoramic video, and each image region (corresponding to the front sub-image in step 110) in the strip panorama corresponds to multiple consecutive frames in the 360-degree panoramic video. Therefore, time information or geographic location information of each image region in the strip panorama may be time information or geographic location information corresponding to a 360-degree panoramic video frame. The time information may be a time of collecting the 360-degree panoramic video frame, for example, a relative collection time or an absolute collection time. The geographic location information may be geographic location information of multiple 360-degree panoramic video frames. It should be noted that due to different precision of geographic location information and different sampling precision of video frames, multiple video frames may be corresponding to same geographic location information.

To establish a correspondence between the identification information of the first strip panorama and the identification information of the 360-degree panoramic video frame, the first strip panorama may be identified by a geographic location of the corresponding 360-degree panoramic video frame, or identified by a serial number of the corresponding 360-degree panoramic video frame, or identified by time range information of multiple consecutive frames in the corresponding 360-degree panoramic video, or identified by a location or indication information of the corresponding 360-degree panoramic video frame in a 360-degree panoramic video stream.

A specific example is provided in the following for description. The first strip panorama may be identified by a time. If a time range for collecting a 360-degree panoramic video frame corresponding to the first strip panorama is [$t_1$, $t_2$], a time identifier of the first strip panorama may be $t_1$, or may be two attributes, $t_1$ and a time interval, or may be a start time $t_1$ and an end time $t_2$. Alternatively, the first strip panorama may be identified by a geographic location. For example, if a geographic location for collecting a 360-degree panoramic video frame corresponding to the first strip panorama is $P_1$, the identification information of the first strip panorama may be $P_1$ or other description indicative of $P_1$. Alternatively, the first strip panorama may be identified by a serial number. For example, 1, 2, 3, . . . are used to identify a location of the first strip panorama in strip panoramas, and the 360-degree panoramic video frame corresponding to the first strip panorama is also identified by a corresponding serial number. Alternatively, the first strip panorama may be identified by the location or the indication information of the corresponding 360-degree panoramic video frame in the 360-degree panoramic video stream. In addition, description of a corresponding identifier is added to the description file, and information about the 360-degree panoramic video frame corresponding to the first strip panorama is provided in the description file. For example, if the location of the corresponding 360-degree panoramic video frame in the 360-degree panoramic video stream is indicated by a serial number or a byte range, the first strip panorama may be identified by the serial number or the byte range of the corresponding 360-degree panoramic video frame. Moreover, alternatively, the identification information of the strip panorama and the identification information of the 360-degree panoramic video may be described in a same file such that a strip panorama and a 360-degree panoramic video segment that are in correspondence to each other have same or corresponding identification information. For example, if a serial number of the first strip panorama is the same as a serial number of a first 360-degree panoramic video segment, it may be considered by default that the first strip panorama and the first 360-degree panoramic video segment are the same in terms of time or a geographic location. Therefore, the strip panorama and the 360-degree panoramic video segment can be flexibly switched according to the correspondence.

In this embodiment of the present disclosure, a strip panorama is generated using a 360-degree panoramic video, and the correspondence between the strip panorama and the 360-degree panoramic video frame can be established using a time feature of the 360-degree panoramic video. Therefore, a user can flexibly switch between the strip panorama and the 360-degree panorama according to a personal interest, and user experience is enhanced.

The first region may be any region at a road side, and the road side may include multiple first regions. In this embodiment of the present disclosure, only the first strip panorama used to display the first region is used as an example to describe a process of generating a strip panorama using a 360-degree panoramic video. A strip panorama displays another first region at the road side may be obtained according to the foregoing method, and details are not described herein.

In this embodiment of the present disclosure, an entire strip panorama displaying the road side may include multiple first strip panoramas. The entire strip panorama displaying the road side is divided into multiple first strip panoramas to display multiple first regions of the road side, and an entire 360-degree panoramic video shot along the entire road is divided into multiple 360-degree panoramic video segments corresponding to the multiple first regions. In this way, the user can directly switch to a strip panorama or a 360-degree panoramic video segment corresponding to a region that the user wants to watch, and does not switch to the entire strip panorama or the entire 360-degree panoramic video. Therefore, search overheads can be reduced and a response time can be reduced.

It should be noted that because a random access point is generated in a process of encoding a video, the video can start to be played only at the random access point. Consequently, the video cannot be segmented randomly, and needs to be divided at the random access point. Therefore, the entire strip panorama may be divided into multiple first strip panoramas in a same manner as 360-degree panoramic video segmentation. Correspondingly, time information of the first strip panorama may be time information of a corresponding 360-degree panoramic video segment.

In this embodiment of the present disclosure, the entire strip panorama of the road side may be divided into multiple first strip panoramas according to preset time information or width information such that a time period corresponding to each first strip panorama meets a preset time period requirement, or a width corresponding to each first strip panorama meets a preset width requirement.

Optionally, in another embodiment, capturing, from the $j^{th}$ 360-degree panoramic video frame in the multiple 360-degree panoramic video frames, the front image used to display the $i^{th}$ sub-region in the first region may include determining a first direction of the $i^{th}$ sub-region in the first region and along which the $j^{th}$ 360-degree panoramic video frame in the 360-degree panoramic video is shot, determining a second direction that forms a 90-degree included angle with the first direction, and capturing, from the $j^{th}$ 360-degree panoramic video frame in the 360-degree panoramic video, a front image shot in the second direction and used to display the $i^{th}$ sub-region in the first region. In this case, a front image displaying a specified region at the road side is captured from the 360-degree panoramic video frame.

In this embodiment of the present disclosure, when a 360-degree panoramic camera moves along a streetside direction, a front image displaying a streetside region is shot in a direction perpendicular to a movement direction of the 360-degree panoramic camera. In this case, the movement direction of the 360-degree panoramic camera may be obtained, a third direction that forms a 90-degree included angle with the movement direction of the 360-degree panoramic camera may be determined, and a front image shot in the third direction and used to display the $i^{th}$ sub-region in the first region is captured from the $j^{th}$ 360-degree panoramic video frame in the 360-degree panoramic video.

Optionally, in an embodiment, after the identification information of the first object is obtained in step 110, the method 100 may further include determining the identification information of the second object corresponding to the identification information of the first object, and sending first request information to a server to request the second object, where the first request information includes the identification information of the second object. Correspondingly, the second object sent by the server is received in step 120. In this embodiment of the present disclosure, the second object is stored in the server. After determining the identification information of the second object to which the terminal device is to be switched, the terminal device requests, from the server, the second object corresponding to the identification information of the second object.

Alternatively, in another embodiment, after the identification information of the first object is obtained in step 110, the method 100 may further include sending second request information to a server to request the second object, where the second request information includes the identification information of the first object such that the server determines the identification information of the second object according to the identification information of the first object, and determines the second object according to the identification information of the second object. Correspondingly, the second object sent by the server is received in step 120. In this embodiment of the present disclosure, the identification information of the second object and the second object are stored in the server. After receiving the switching instruction, the terminal device needs to request, from the server, the second object corresponding to the identification information of the first object.

Optionally, in another embodiment, the first object is the first 360-degree panorama, the second object is the first strip panorama, and after a switching instruction for switching the displayed first 360-degree panorama to the first strip panorama is received, the method 100 may further include obtaining display resolution of an image presentation device. Obtaining, according to the identification information of the first object, the second object corresponding to the identification information of the first object includes obtaining, according to the identification information of the first 360-degree panorama and the display resolution, multiple consecutive strip panoramas that include the first strip panorama, where the multiple strip panoramas form a second strip panorama of a second region in which the first region is located. Presenting the second object includes presenting, according to identification information of the multiple strip panoramas, the second strip panorama formed by splicing the multiple strip panoramas.

When the display resolution of the image presentation device (such as the terminal device) is higher than resolution of a first strip panorama, multiple strip panoramas that include the first strip panorama may be obtained. In this case, a front image of a streetside region with a wider angle of view and formed by splicing the multiple strip panoramas can be presented.

Optionally, to-be-obtained strip panoramas may be determined according to location information of the first strip panorama in the entire strip panorama that display a side view of the entire road. For example, i strip panoramas before the first strip panorama and i strip panoramas after the first strip panorama may be obtained.

Therefore, according to the image presentation method in this embodiment of the present disclosure, a 360-degree panorama and a strip panorama can be flexibly switched according to a correspondence between identification information of the 360-degree panorama and identification information of the strip panorama such that visual experience of a user can be enriched.

FIG. 2 shows a schematic flowchart of an image presentation method 200 according to another embodiment of the present disclosure. The method 200 may be implemented by a server. As shown in FIG. 2, the method 200 includes the following content.

Step 210: Receive request information sent by a terminal device and used for requesting a second object, where the request information includes identification information of a first object, one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, where i and j are positive integers.

Step 220: Determine, according to the identification information of the first object, identification information of the second object corresponding to the identification information of the first object.

Step 230: Determine the second object according to the identification information of the second object.

Step 240: Send the second object to the terminal device such that the terminal device presents the second object.

Therefore, according to the image presentation method in this embodiment of the present disclosure, a 360-degree panorama or a strip panorama to which a terminal device is to be switched is sent to the terminal device according to a correspondence between identification information of the 360-degree panorama and identification information of the strip panorama such that the terminal device can flexibly switch between the 360-degree panorama and the strip panorama, and visual experience of a user can be enriched.

In this embodiment of the present disclosure, the identification information of the first object and the identification information of the second object may be denoted by time information or geographic location information of shooting the first 360-degree panorama. Further, refer to the corresponding description about the identification information of the first object and the identification information of the second object in the method 100 in FIG. 1. Details are not described herein.

Optionally, in another embodiment, the multiple 360-degree panoramas are multiple 360-degree panoramic video frames in a 360-degree panoramic video, and the 360-degree panoramic video is shot using a 360-degree panoramic camera along an extension direction of a road on which the first region is located. Before the determining, according to the identification information of the first object, identification information of the second object corresponding to the identification information of the first object, the method further includes obtaining the 360-degree panoramic video, where a $j^{th}$ 360-degree panoramic video frame in the multiple 360-degree panoramic video frames includes the front image used to display the $i^{th}$ sub-region in the first region, capturing, from the $j^{th}$ 360-degree panoramic video frame in the multiple 360-degree panoramic video frames, the front image used to display the $i^{th}$ sub-region in the first region, splicing, into the first strip panorama, front images that are captured from the multiple 360-degree panoramic video frames and used to display multiple sub-regions in the first region, and establishing a correspondence between identification information of the first strip panorama and identification information of a first 360-degree panoramic video frame in the multiple 360-degree panoramic video frames.

The first region may be any region at a road side, and the road side may include multiple first regions. In this embodiment of the present disclosure, only the first strip panorama used to display the first region is used as an example to describe a process of generating a strip panorama according to a 360-degree panoramic video. A strip panorama displaying another first region at the road side may be obtained according to the foregoing method, and details are not described herein.

In this embodiment of the present disclosure, an entire strip panorama of the road side is divided into multiple first strip panoramas that are used to display multiple first regions at the road side, and an entire 360-degree panoramic video shot along the entire road is divided into multiple 360-degree panoramic video segments corresponding to the multiple first regions. In this way, the server needs to send, to the terminal device, only a strip panorama or a 360-degree panoramic video segment corresponding to a region that the user wants to watch, and does not need to send the entire strip panorama or the entire 360-degree panoramic video such that bandwidth is saved. In addition, when receiving an object to which the terminal device is to be switched and sent by the server, the terminal device does not need to search the entire strip panorama or the entire 360-degree panoramic video for the region that the user wants to watch such that search overheads can be reduced and a response time can be reduced.

It should be noted that because a random access point is generated in a process of encoding a video, the video can start to be played only at the random access point. Consequently, the video cannot be segmented randomly, and needs to be divided at the random access point. Therefore, the entire strip panorama may be divided into multiple first strip panoramas in a same manner as 360-degree panoramic video segmentation. Correspondingly, time information of the first strip panorama may be time information of a corresponding 360-degree panoramic video segment.

In another embodiment, capturing, from the $j^{th}$ 360-degree panoramic video frame in the multiple 360-degree panoramic video frames, the front image displaying the $i^{th}$ sub-region in the first region includes determining a first direction of the $i^{th}$ sub-region in the first region and along which the $j^{th}$ 360-degree panoramic video frame in the 360-degree panoramic video is shot, determining a second direction that forms a 90-degree included angle with the first direction, and capturing, from the $j^{th}$ 360-degree panoramic video frame in the 360-degree panoramic video, a front image shot in the second direction and used to display the $i^{th}$ sub-region in the first region. In this case, a front image display a specified region at the road side is captured from the 360-degree panoramic video frame.

Optionally, in another embodiment, the first object is the first 360-degree panorama, the second object is the first strip panorama, and the request information further includes display resolution of the terminal device. After the corresponding first strip panorama is determined according to the identification information of the first strip panorama, the method further includes determining, according to the display resolution, multiple consecutive strip panoramas that include the first strip panorama, where the multiple strip panoramas form a second strip panorama of a second region in which the first region is located. Sending the second object to the terminal device includes sending the multiple strip panoramas to the terminal device such that the terminal device presents the second strip panorama formed by splicing the multiple strip panoramas.

When the request information sent by the terminal device includes the display resolution of the terminal device, the multiple strip panoramas that include the first strip panorama and meet the resolution of the terminal device may be sent to the terminal device such that the terminal device can present a front image of a streetside region, and the front image has a wider angle of view and is formed by splicing the multiple strip panoramas.

Optionally, the server may determine to-be-obtained specific strip panoramas according to location information of the first strip panorama, sent by the terminal device, in the entire strip panorama. For example, i strip panoramas before the first strip panorama and i strip panoramas after the first strip panorama may be obtained.

Therefore, according to the image presentation method in this embodiment of the present disclosure, a 360-degree panorama or a strip panorama to which a terminal device is to be switched is sent to the terminal device according to a correspondence between identification information of the 360-degree panorama and identification information of the strip panorama such that the terminal device can flexibly switch between the 360-degree panorama and the strip panorama, and visual experience of a user can be enriched.

Figure 3A:
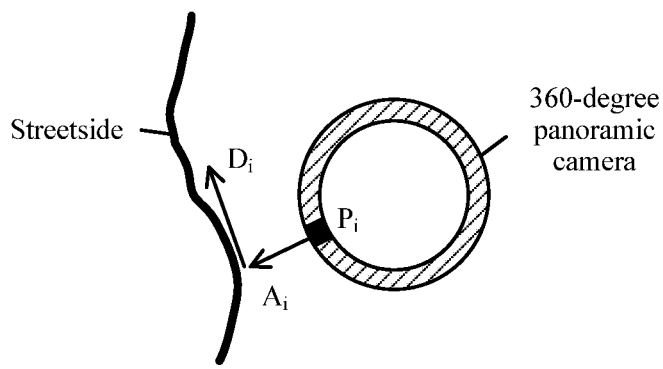
FIG. 3A and FIG. 3B are schematic diagrams of a scenario of shooting a 360-degree panorama according to an embodiment of the present disclosure.

In the following, a strip panorama generation method 300 according to an embodiment of the present disclosure is described in detail with reference to FIG. 3A and FIG. 3B. In the following description, a streetside image is used as an example of a strip panorama, and the streetside image is formed by splicing multiple streetside sub-images. The strip panorama generation method 300 may be implemented by the terminal device in the embodiment shown in FIG. 1, or may be implemented by the server in the embodiment shown in FIG. 2. The method 300 includes the following content.

Step 310: Obtain a 360-degree panoramic video shot along a road extension direction.

Step 320: Obtain information, such as a navigation image or map information, about a street on which a 360-degree panoramic camera is located when shooting an $i^{th}$ 360-degree panoramic video frame in the 360-degree panoramic video, determine a streetside direction $D_i$, and then determine a direction $A_i$ perpendicular to the streetside direction $D_i$, as shown in FIG. 3A.

Figure 3B:
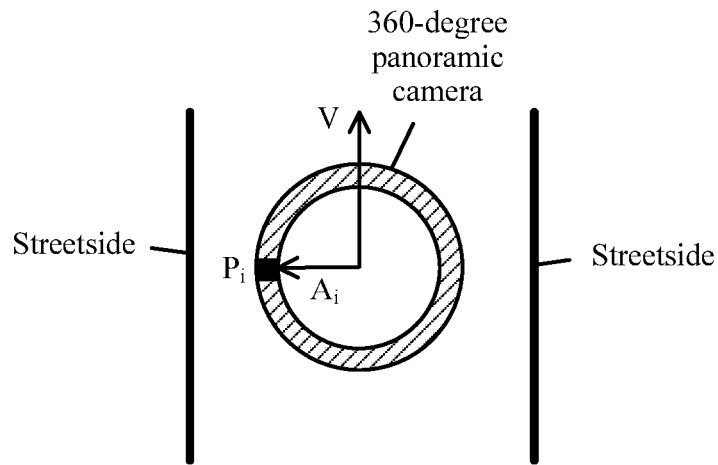

Optionally, as shown in FIG. 3B, when the panoramic camera moves along the streetside direction, the direction $A_i$ perpendicular to a movement direction of the panoramic camera is determined.

Step 330: Capture, from the $i^{th}$ 360-degree panoramic video frame, a streetside sub-image $P_i$ of a streetside region and shot in the specified direction $A_i$.

A width X of the image captured from the $i^{th}$ 360-degree panoramic video frame is related to movement velocity V of the panoramic camera. X=f×V, where f is a coefficient, and is related to image resolution. Alternatively, a width X of the streetside sub-image captured from the 360-degree panoramic video frame may be a preset fixed value. This is not limited in this embodiment of the present disclosure. A height of the streetside sub-image may be a shooting height of the camera, or may be a preset fixed value.

Step 340: Record time information of each of multiple streetside sub-images captured from the 360-degree panoramic video, where the time information of the multiple streetside sub-images are in correspondence with time information of the multiple 360-degree panoramic video frames.

For example, the time information of the streetside sub-image may be a time of the 360-degree panoramic video frame that the streetside sub-image is in, or may be a relative offset time relative to a play start time of the 360-degree panoramic video frame, or may be a global time.

The multiple streetside sub-images are spliced according to the time information of the multiple streetside sub-images such that a streetscape panorama of the streetside region can be generated.

Step 350: Splice the multiple streetside sub-images into multiple streetside images that are used to display a relatively large streetside region, and store the streetside images to reduce costs of managing image fragments.

For example, M streetside sub-images in a streetscape panorama are divided into N image segments according to time information, where M>N such that a time period corresponding to each image segment meets a preset time period requirement. Alternatively, M streetside sub-images in the streetscape panorama are divided into N streetside images according to width information, where M>N such that a width corresponding to each streetside image segment meets a preset width requirement.

Alternatively, when the 360-degree panoramic video is segmented and stored, multiple streetside sub-images may be combined into multiple streetside images according to a 360-degree panoramic video segmentation manner such that a start time of each streetside image is a start time of a 360-degree panoramic video segment. That is, time information of each streetside image may be the same as time information of the corresponding 360-degree panoramic video segment.

Step 360: Record time information of the streetside image. For example, the time information of the streetside image may be start and end times $(t_i, t_{i+k})$, may be a start time of a covered streetside sub-image, may be time information of a streetside sub-image in a central location of the presented image, may be a time interval, or may be time information of any covered streetside sub-image.

Optionally, description information of the streetside image may be recorded. The description information of the streetside image may include description information of all streetside sub-images covered by the streetside image. Alternatively, description information of the streetside image may be description information of a representative streetside sub-image. The description information may include location information, such as location coordinates $(x_i, y_i)$, where $x_i$ a location coordinate of the streetside sub-image in the entire streetscape panorama in a horizontal direction, and $y_i$ a height of the streetside sub-image, or the location information is only $x_i$. Alternatively, the description information may include azimuth information, and the azimuth information may denote a location of the streetside image in the 360-degree panoramic video. When there are streetside images of both sides of a street, the user can accurately switch, according to azimuth information of a streetside image, to a streetside image of a side of the street that the user wants to watch. Alternatively, the description information of the streetside image may include width information and height information of the streetside image. The width information of the streetside image may be a sum of widths of all streetside sub-images covered by the streetside image. Alternatively, the description information of the streetside image may further include an identifier (such as a serial number) of the streetside sub-image.

The obtained multiple streetside images and the description information of the multiple streetside images are stored. It should be understood that the multiple streetside images and the description information of the streetside images may be stored separately, or may be stored together. The multiple streetside images may be spliced into a panorama of the streetside region for storage, or the multiple streetside images may be stored separately.

In this embodiment of the present disclosure, a strip streetside image is generated using a 360-degree panoramic video, and a correspondence between the streetside image and a 360-degree panoramic video frame can be established using a time feature of the 360-degree panoramic video. Therefore, a user can flexibly switch between the streetside image and the 360-degree panorama according to a personal interest, and user experience can be enhanced.

In the following, an image presentation method according to an embodiment of the present disclosure is further described with reference to FIG. 4 and FIG. 5. A streetside image in the following description may be generated according to a strip panorama generation method 300.

Figure 4:
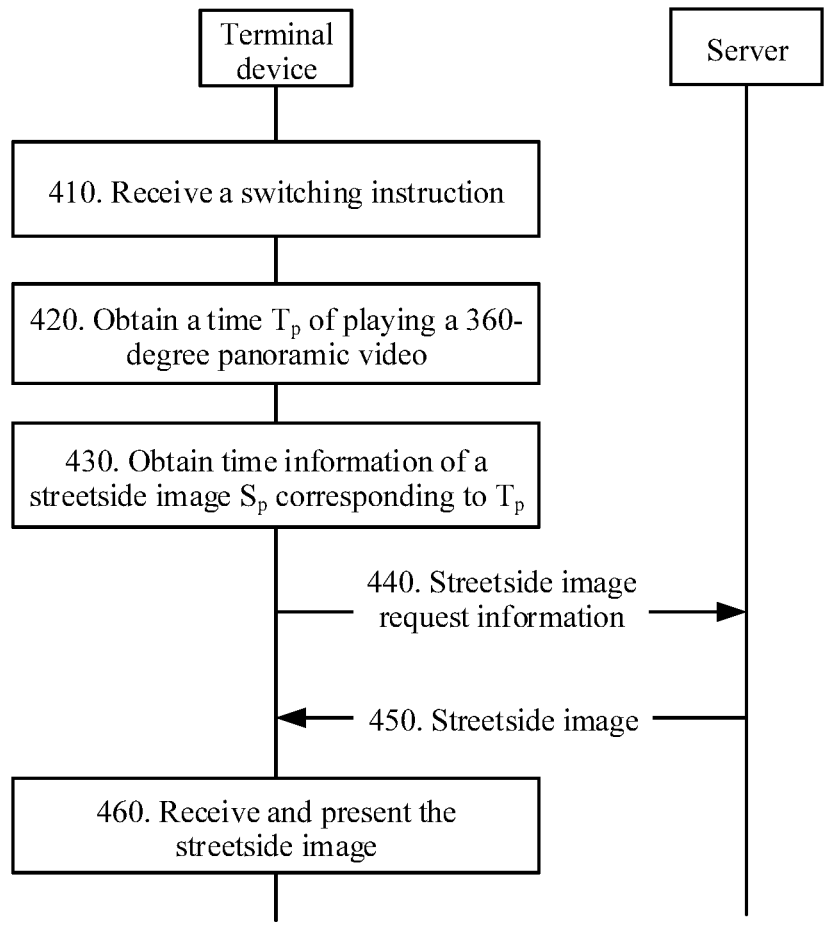
FIG. 4 is a schematic flowchart of an image presentation method according to another embodiment of the present disclosure.

FIG. 4 shows an image presentation method according to an embodiment of the present disclosure. The method is described using a process of switching from a 360-degree panoramic video to a streetside image as an example. FIG. 4 is described using a terminal device and a server as examples. It should be understood that actions separately performed by the terminal device and the server may be performed by local applications or local modules of the terminal device.

Step 410: A terminal device presents a 360-degree panoramic video, and receives a switching instruction indicating that a user wants to watch a streetside image.

Step 420: The terminal device obtains a time $T_p$ of playing the 360-degree panoramic video of a current moment.

Step 430: The terminal device obtains, according to $T_p$, time information of a streetside image $S_p$ corresponding to $T_p$.

For example, the time information of the streetside image $S_p$ includes $T_p$, or the time information of the streetside image $S_p$ includes a time point nearest to $T_p$.

Optionally, the terminal device may obtain display resolution and location information of the streetside image $S_p$, and obtain, using the streetside image $S_p$ as a central image and according to the display resolution of the terminal and location information of the streetside image $S_p$, information about all streetside images $S_{p-i}, \ldots, S_p, \ldots,$ and $S_{p+i}$ that meet a play requirement of the terminal.

It should also be understood that if a streetside image to which the terminal device is to be switched includes streetside images of both sides of a street, in step 420, the terminal device may further obtain azimuth information of the streetside image that the user wants to watch, for example, the azimuth information of the streetside image may denote one side of the street corresponding to a location selected by the user. In this case, in step 430, the terminal device determines, according to the azimuth information of the streetside image to which the terminal device is to be switched, description information of the streetside image that the user wants to watch, and then obtains, according to $T_p$, time information of the streetside image $S_p$ corresponding to $T_p$.

Step 440: The terminal device sends streetside image request information to a server to request a streetside image corresponding to the currently played 360-degree panoramic video.

For example, the streetside image request information may include $(S_p, i)$, indicating that i streetside images before $S_p$ and i streetside images after $S_p$ are requested. Alternatively, the streetside image request information may be presented in another form, for example, by consecutively sending request information of $S_{p-i}, \ldots, S_p, \ldots,$ and $S_{p+i}$. Alternatively, the streetside image request information includes values of $S_p$ and 2×i+1 or values of $S_{p-i}$ and 2×i+1.

The streetside image request information may further include information about the terminal device, for example, display resolution, a terminal model, and a buffer such that the server can determine a streetside image that meets terminal device performance.

Step 450: The server receives the request information sent by the terminal device, and sends a corresponding streetside image to the terminal device.

Step 460: The terminal device receives and presents the streetside image.

Figure 5:
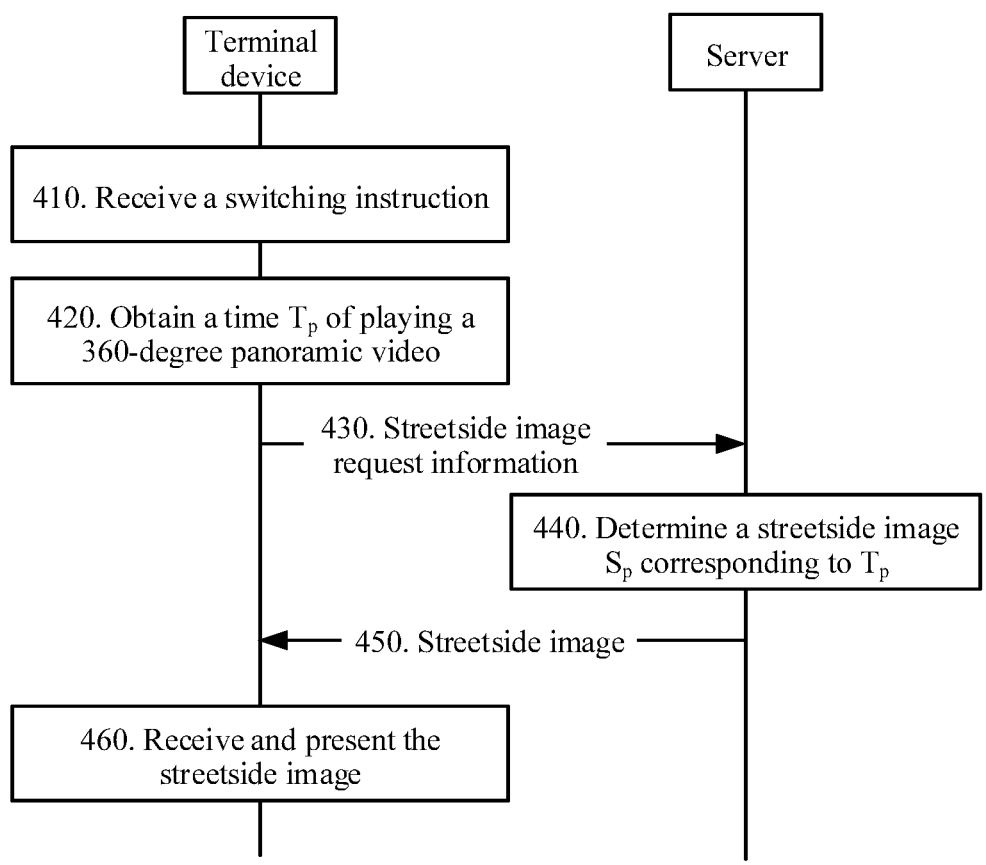
FIG. 5 is a schematic flowchart of an image presentation method according to another embodiment of the present disclosure.

It should be understood that, as shown in FIG. 5, after step 420 is performed, in step 430, the terminal device may directly send the streetside image request information to the server. The streetside image request information includes at least the time $T_p$ of playing the 360-degree panoramic video. It should be understood that the request information may further include display resolution of the terminal device, azimuth information of the streetside image in the 360-degree panoramic video, and location information of the streetside image in the streetscape panorama. Correspondingly, in step 440, the server may determine, according to $T_p$ and the azimuth information, the streetside image $S_p$ corresponding to $T_p$, and may further determine, according to the display resolution of the terminal device and the location information of the streetside image, all streetside images $S_{p-i}, \ldots, S_p, \ldots,$ and $S_{p+i}$ that meet a play requirement of the terminal device.

In this embodiment of the present disclosure, according to a correspondence between a 360-degree panoramic video and a streetside image, flexible switching can be performed between the 360-degree panoramic video and the streetside image by means of interaction between a terminal device and a server.

Figure 6:
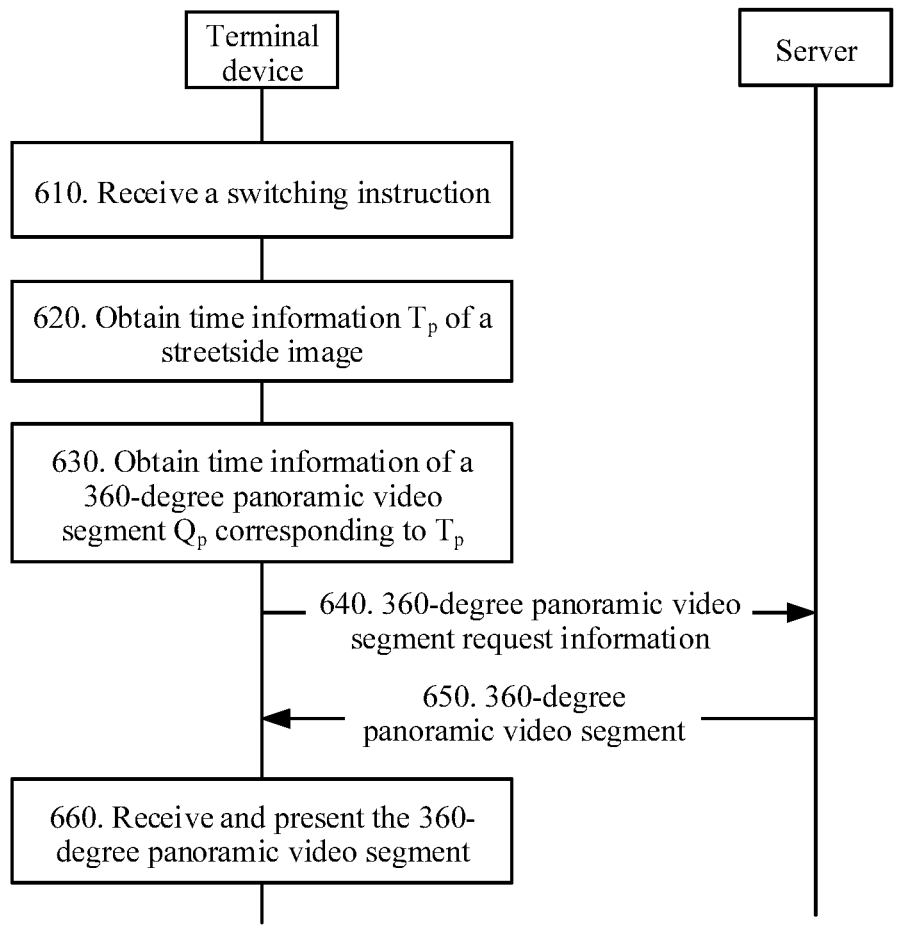
FIG. 6 is a schematic flowchart of an image presentation method according to another embodiment of the present disclosure.

FIG. 6 shows an image presentation method according to another embodiment of the present disclosure. The method is described using a process of switching from a streetside image to a 360-degree panoramic video as an example. FIG. 6 is still described using a terminal device and a server as examples. It should be understood that actions separately performed by the terminal device and the server may be performed by local applications or local modules of the terminal device.

Step 610: A terminal device presents a streetside image, and receives a switching instruction indicating that a user wants to watch a 360-degree panoramic video.

Step 620: The terminal device obtains time information $T_p$ of a streetside image of a current moment.

$T_p$ may be time information of a streetside sub-image in a central location of the presented streetside image.

Alternatively, $T_p$ may be time information of any time point in a time period covered in the currently presented streetside image. For example, if a time range covered by the streetside image is $[t_1, t_{10}]$, $T_p$ may be any time point in the range $[t_1, t_{10}]$.

Step 630: The terminal device obtains, according to $T_p$, time information of a 360-degree panoramic video segment $Q_p$ corresponding to $T_p$.

For example, the time information of the 360-degree panoramic video segment $Q_p$ includes $T_p$, or the time information of the 360-degree panoramic video segment $Q_p$ includes a time point nearest to $T_p$.

Alternatively, the terminal device may obtain, according to $T_p$, time information of a 360-degree panoramic video segment $Q_p$ corresponding to a random access point whose start time is less than or equal to $T_p$.

Step 640: The terminal device sends request information to a server to request a 360-degree panoramic video segment corresponding to the currently played streetside image.

The request information may include the time information of the 360-degree panoramic video segment $Q_p$. The request information may further include information about the terminal device, for example, display resolution, a terminal model, and a buffer such that the server determines a 360-degree panoramic video segment that meets terminal device performance.

Step 650: The server receives the request information sent by the terminal device, and sends the 360-degree panoramic video segment corresponding to the streetside image to the terminal device.

Step 660: The terminal device receives and presents the 360-degree panoramic video segment sent by the server.

In this embodiment of the present disclosure, according to a correspondence between a 360-degree panoramic video and a streetside image, flexible switching can be performed between the 360-degree panoramic video and the streetside image by means of interaction between a terminal device and a server.

Figure 7:
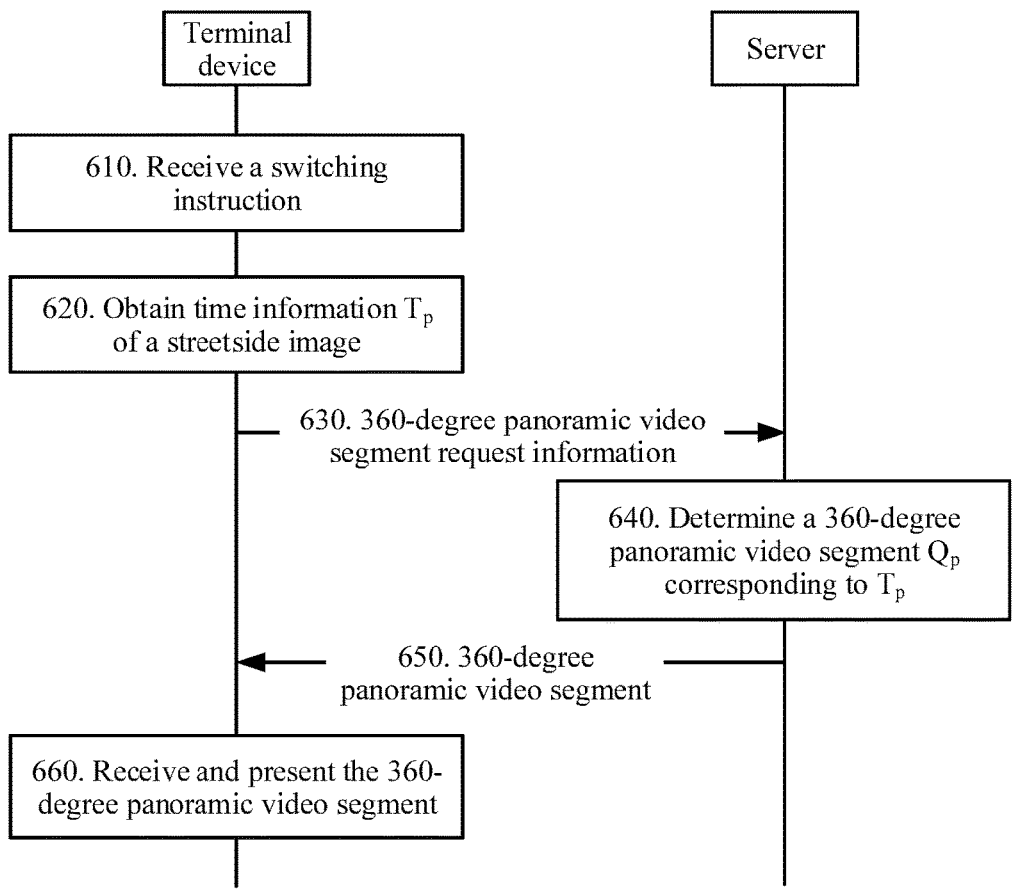
FIG. 7 is a schematic flowchart of an image presentation method according to another embodiment of the present disclosure.

It should be understood that, as shown in FIG. 7, in step 630, the terminal device directly sends 360-degree panoramic video segment request information to the server after performing step 620. In this case, the request information sent by the terminal device to the server includes at least the time information $T_p$ of the streetside image. It should be understood that the request information may further include display resolution of the terminal device. Correspondingly, in step 640, the server may determine, according to $T_p$, the 360-degree panoramic video segment $Q_p$ corresponding to $T_p$.

Figure 8:
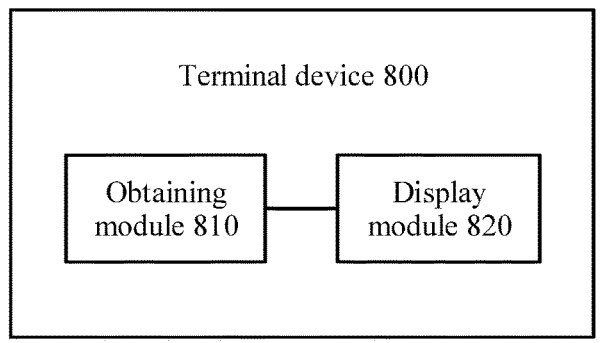
FIG. 8 is a schematic block diagram of a terminal device according to an embodiment of the present disclosure.

FIG. 8 is a schematic block diagram of a terminal device 800 according to an embodiment of the present disclosure. As shown in FIG. 8, the terminal device 800 includes an obtaining module 810 and a display module 820.

The obtaining module 810 is configured to obtain identification information of a first object when a switching instruction for switching the displayed first object to a second object is received. One of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers.

The obtaining module 810 is further configured to obtain, according to the identification information of the first object, the second object corresponding to the identification information of the first object. There is a correspondence between the identification information of the first object and identification information of the second object.

The display module 820 is configured to present the second object.

Therefore, according to the terminal device 800 in this embodiment of the present disclosure, a 360-degree panorama and a strip panorama can be flexibly switched according to a correspondence between identification information of the 360-degree panorama and identification information of the strip panorama such that visual experience of a user can be enriched.

Figure 9:
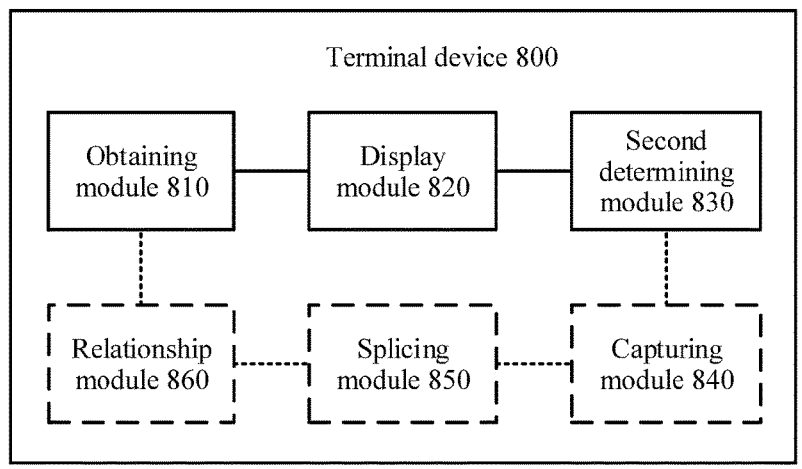
FIG. 9 is a schematic block diagram of a terminal device according to another embodiment of the present disclosure.

Optionally, in another embodiment, as shown in FIG. 9, the terminal device 800 further includes a second determining module 830 configured to determine the identification information of the second object corresponding to the identification information of the first object. The obtaining module 810 is further configured to obtain the second object according to the identification information of the second object.

Optionally, in another embodiment, the multiple 360-degree panoramas are multiple 360-degree panoramic video frames in a 360-degree panoramic video, and the 360-degree panoramic video is shot using a 360-degree panoramic camera along an extension direction of a road on which the first region is located. The obtaining module 810 is further configured to obtain the 360-degree panoramic video before obtaining the identification information of the first object, where a $j^{th}$ 360-degree panoramic video frame in the multiple 360-degree panoramic video frames includes the front image used to display the $i^{th}$ sub-region in the first region. The terminal device 800 further includes a capturing module 840 configured to capture, from the $j^{th}$ 360-degree panoramic video frame in the multiple 360-degree panoramic video frames, the front image used to display the $i^{th}$ sub-region in the first region, a splicing module 850 configured to splice, into the first strip panorama, front images that are captured from the multiple 360-degree panoramic video frames and used to display multiple sub-regions in the first region, and a relationship module 860 configured to establish a correspondence between identification information of the first strip panorama and identification information of a first 360-degree panoramic video frame in the multiple 360-degree panoramic video frames.

In this embodiment of the present disclosure, the second determining module 830 may be further configured to determine a first direction of the $i^{th}$ sub-region in the first region and along which the $j^{th}$ 360-degree panoramic video frame in the 360-degree panoramic video is shot, and determine a second direction that forms a 90-degree included angle with the first direction. The capturing module 840 may be further configured to capture, from the $j^{th}$ 360-degree panoramic video frame in the 360-degree panoramic video, a front image shot in the second direction determined by the second determining module 830 and displays the $i^{th}$ sub-region in the first region.

Figure 10:
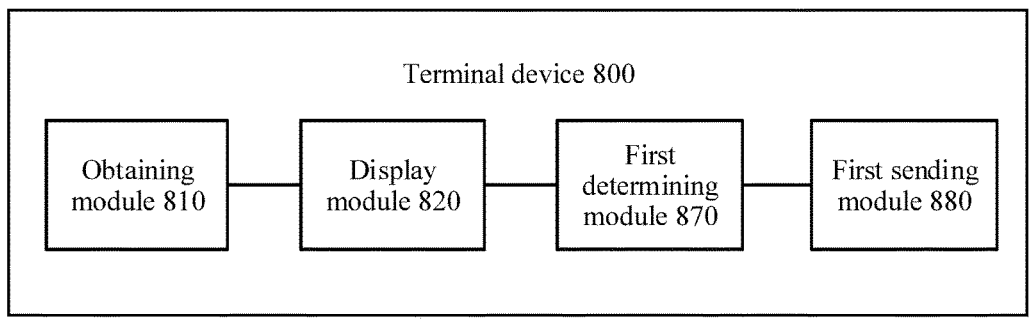
FIG. 10 is a schematic block diagram of a terminal device according to another embodiment of the present disclosure.

Optionally, in another embodiment, as shown in FIG. 10, the terminal device 800 may further include a first determining module 870 configured to determine the identification information of the second object corresponding to the identification information of the first object after the obtaining module 810 obtains the identification information of the first object, and a first sending module 880 configured to send first request information to a server to request the second object, where the first request information includes the identification information of the second object. The obtaining module 810 is further configured to receive the second object sent by the server.

Figure 11:
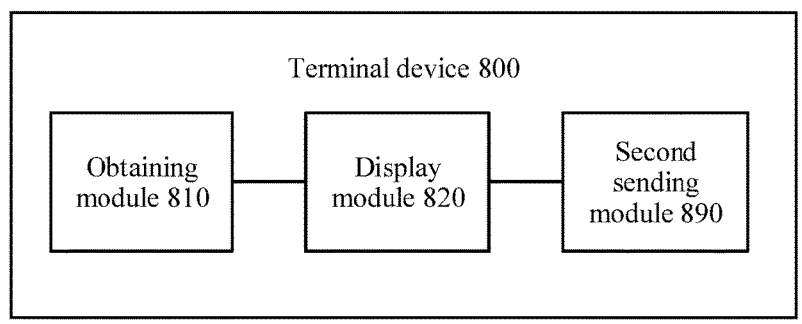
FIG. 11 is a schematic block diagram of a terminal device according to another embodiment of the present disclosure.

Optionally, in another embodiment, as shown in FIG. 11, the terminal device 800 may further include a second sending module 890 configured to send second request information to a server to request the second object after the obtaining module 810 obtains the identification information of the first object. The second request information includes the identification information of the first object such that the server determines the identification information of the second object according to the identification information of the first object, and determines the second object according to the identification information of the second object. The obtaining module 810 is further configured to receive the second object sent by the server.

Optionally, in another embodiment, the first object is the first 360-degree panorama, and the second object is the first strip panorama. The obtaining module 810 is further configured to obtain display resolution of a device presenting the first strip panorama after a switching instruction for switching the displayed first 360-degree panorama to the first strip panorama is received. The obtaining module 810 is further configured to obtain, according to the identification information of the first 360-degree panorama and the display resolution, multiple consecutive strip panoramas that include the first strip panorama. The multiple strip panoramas form a second strip panorama of a second region in which the first region is located. The display module 820 is further configured to present, according to identification information of the multiple strip panoramas, the second strip panorama formed by splicing the multiple strip panoramas.

In this embodiment of the present disclosure, the identification information of the first object and the identification information of the second object may be denoted by time information or geographic location information of shooting the first 360-degree panorama.

It should be understood that the terminal device 800 according to this embodiment of the present disclosure may be corresponding to the terminal device in the embodiments of the present disclosure, and the foregoing and other operations and/or functions of each module in the terminal device 800 are used to implement corresponding procedures of the method 100 in FIG. 1. For brevity, details are not described herein.

Therefore, according to the terminal device 800 in this embodiment of the present disclosure, a 360-degree panorama and a strip panorama can be flexibly switched according to a correspondence between identification information of the 360-degree panorama and identification information of the strip panorama such that visual experience of a user can be enriched.

Figure 12:
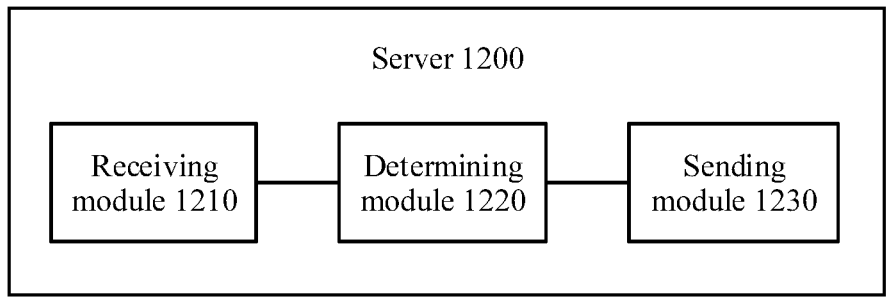
FIG. 12 is a schematic block diagram of a server according to an embodiment of the present disclosure.

FIG. 12 is a schematic structural diagram of a server 1200 according to an embodiment of the present disclosure. As shown in FIG. 12, the server 1200 includes a receiving module 1210, a determining module 1220, and a sending module 1230.

The receiving module 1210 is configured to receive request information sent by a terminal device and used for requesting a second object. The request information includes identification information of a first object, one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers.

The determining module 1220 is configured to determine, according to the identification information of the first object, identification information of the second object corresponding to the identification information of the first object.

The determining module 1220 is further configured to determine the second object according to the identification information of the second object.

The sending module 1230 is configured to send the second object to the terminal device such that the terminal device presents the second object.

Therefore, according to the server 1200 in this embodiment of the present disclosure, a 360-degree panorama or a strip panorama to which a terminal device is to be switched is sent to the terminal device according to a correspondence between identification information of the 360-degree panorama and identification information of the strip panorama such that the terminal device can flexibly switch between the 360-degree panorama and the strip panorama, and visual experience of a user can be enriched.

Figure 13:
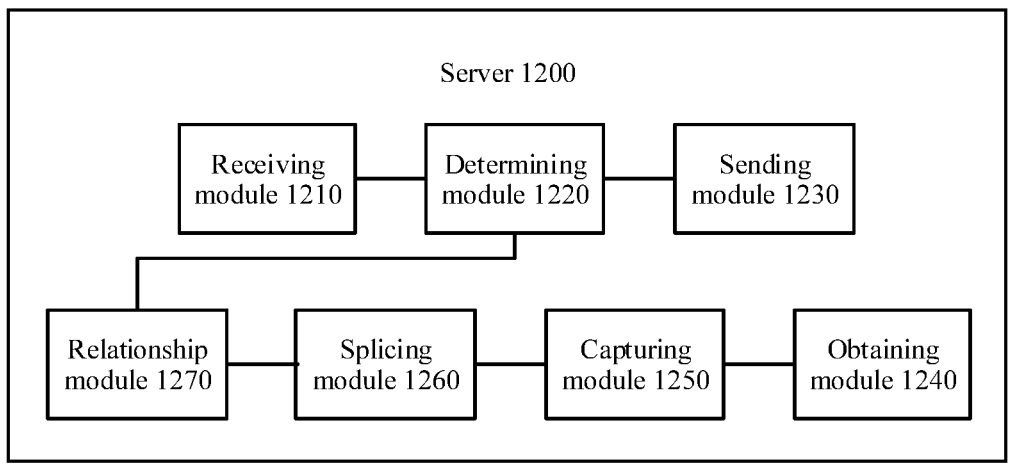
FIG. 13 is a schematic block diagram of a server according to another embodiment of the present disclosure.

Optionally, in another embodiment, the multiple 360-degree panoramas are multiple 360-degree panoramic video frames in a 360-degree panoramic video, and the 360-degree panoramic video is shot using a 360-degree panoramic camera along an extension direction of a road on which the first region is located. As shown in FIG. 13, the server 1200 further includes an obtaining module 1240 configured to obtain the 360-degree panoramic video before the determining module 1220 determines identification information of the second object corresponding to the identification information of the first object, where a $j^{th}$ 360-degree panoramic video frame in the multiple 360-degree panoramic video frames includes the front image used to display the $i^{th}$ sub-region in the first region, a capturing module 1250 configured to capture, from the $j^{th}$ 360-degree panoramic video frame in the multiple 360-degree panoramic video frames, the front image displaying the $i^{th}$ sub-region in the first region, a splicing module 1260 configured to splice, into the first strip panorama, front images that are captured from the multiple 360-degree panoramic video frames and used to display multiple sub-regions in the first region, and a relationship module 1270 configured to establish a correspondence between identification information of the first strip panorama and identification information of a first 360-degree panoramic video frame in the multiple 360-degree panoramic video frames.

In this embodiment of the present disclosure, the determining module 1220 is further configured to determine a first direction of the $i^{th}$ sub-region in the first region and along which the $j^{th}$ 360-degree panoramic video frame in the 360-degree panoramic video is shot, and determine a second direction that forms a 90-degree included angle with the first direction. The capturing module 1250 is further configured to capture, from the $j^{th}$ 360-degree panoramic video frame in the 360-degree panoramic video, a front image shot in the second direction and used to display the $i^{th}$ sub-region in the first region.

Optionally, in another embodiment, the first object is the first 360-degree panorama, the second object is the first strip panorama, and the request information further includes display resolution of the terminal device. The determining module 1220 is further configured to determine, according to the display resolution, multiple consecutive strip panoramas that include the first strip panorama after determining the first strip panorama corresponding to the identification information of the first strip panorama. The multiple strip panoramas form a second strip panorama of a second region in which the first region is located. The sending module 1230 is further configured to send the multiple strip panoramas to the terminal device such that the terminal device presents the second strip panorama formed by splicing the multiple strip panoramas.

In this embodiment of the present disclosure, the identification information of the first object and the identification information of the second object may be denoted by time information or geographic location information of shooting the first 360-degree panorama.

It should be understood that the server 1200 according to this embodiment of the present disclosure may be corresponding to the server in the embodiments of the present disclosure, and the foregoing and other operations and/or functions of each module in the server 1200 are used to implement corresponding procedures of the method 200 in FIG. 2. For brevity, details are not described herein.

Therefore, according to the server 1200 in this embodiment of the present disclosure, a 360-degree panorama or a strip panorama to which a terminal device is to be switched is sent to the terminal device according to a correspondence between identification information of the 360-degree panorama and identification information of the strip panorama such that the terminal device can flexibly switch between the 360-degree panorama and the strip panorama, and visual experience of a user can be enriched.

Figure 14:
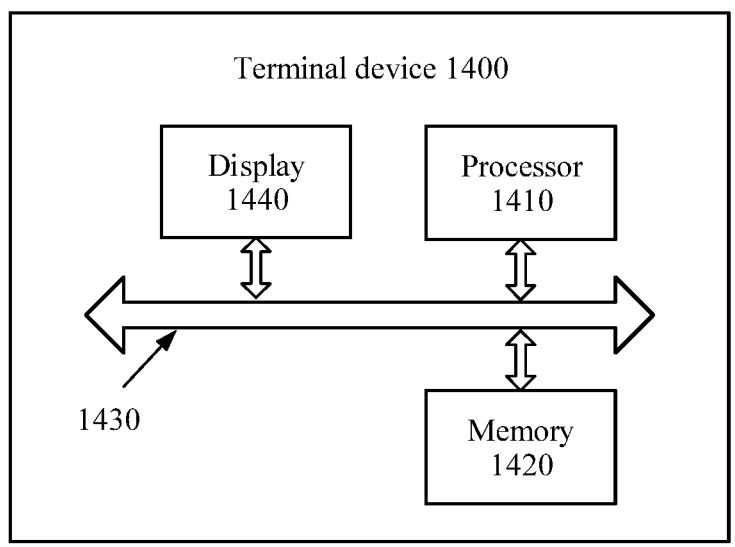
FIG. 14 is a schematic block diagram of a terminal device according to another embodiment of the present disclosure.

FIG. 14 shows a schematic block diagram of a terminal device 1400 according to another embodiment of the present disclosure. As shown in FIG. 14, the terminal device 1400 includes a processor 1410, a memory 1420, a bus system 1430, and a display 1440. The processor 1410, the memory 1420, and the display 1440 are connected using the bus system 1430, the memory 1420 is configured to store an instruction, and the processor 1410 is used to execute, using the bus system 1430, the instruction stored in the memory 1420.

The processor 1410 is configured to obtain identification information of a first object when a switching instruction for switching the displayed first object to a second object is received, where one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers, and obtain, according to the identification information of the first object, the second object corresponding to the identification information of the first object, where there is a correspondence between the identification information of the first object and identification information of the second object.

The display 1440 is configured to present the second object.

Therefore, according to the terminal device 1400 in this embodiment of the present disclosure, a 360-degree panorama and a strip panorama can be flexibly switched according to a correspondence between identification information of the 360-degree panorama and identification information of the strip panorama such that visual experience of a user can be enriched.

It should be understood that, in this embodiment of the present disclosure, the processor 1410 may be a central processing unit (CPU), or the processor 1410 may be another general purpose processor, a digital signal processor (DSP), an application-specific integrated circuit (ASIC), a field programmable gate array (FPGA) or other programmable logical device, a discrete gate or transistor logical device, a discrete hardware assembly, or the like. The general-purpose processor may be a microprocessor, or the processor 1410 may be any conventional processor or the like.

The memory 1420 may include a read-only memory (ROM) and a random access memory (RAM), and provide an instruction and data for the processor 1410. A part of the memory 1420 may further include a non-volatile RAM. For example, the memory 1420 may further store device type information.

The bus system 1430 may include a power supply bus, a control bus, a status signal bus, and the like in addition to a data bus. However, for clarity, various types of buses in the figure are marked as the bus system 1430.

In an implementation process, the steps of the foregoing method may be implemented using an integrated logical circuit of hardware in the processor 1410, or an instruction in a form of software. The steps of the methods disclosed with reference to the embodiments of the present disclosure may be directly implemented by a hardware processor, or may be implemented by a combination of hardware and software modules in the processor. The software module may be located in a storage medium mature in the art, such as a RAM, a flash memory, a ROM, a programmable ROM, or an electrically erasable programmable memory, or a register. The storage medium is located in the memory 1420, and the processor 1410 reads information in the memory 1420 and implements the steps of the foregoing methods in combination with hardware of the processor 1410. To avoid repetition, details are not described herein.

Optionally, in another embodiment, the processor 1410 is further configured to determine the identification information of the second object corresponding to the identification information of the first object, and obtain the second object according to the identification information of the second object.

Optionally, in another embodiment, the multiple 360-degree panoramas are multiple 360-degree panoramic video frames in a 360-degree panoramic video, and the 360-degree panoramic video is shot using a 360-degree panoramic camera along an extension direction of a road on which the first region is located. Before obtaining the identification information of the first object, the processor 1410 is further configured to obtain the 360-degree panoramic video, where a $j^{th}$ 360-degree panoramic video frame in the multiple 360-degree panoramic video frames includes the front image used to display the $i^{th}$ sub-region in the first region, capture, from the $j^{th}$ 360-degree panoramic video frame in the multiple 360-degree panoramic video frames, the front image used to display the $i^{th}$ sub-region in the first region, splice, into the first strip panorama, front images that are captured from the multiple 360-degree panoramic video frames and used to display multiple sub-regions in the first region, and establish a correspondence between identification information of the first strip panorama and identification information of a first 360-degree panoramic video frame in the multiple 360-degree panoramic video frames.

In this embodiment of the present disclosure, the processor 1410 is further configured to determine a first direction of the $i^{th}$ sub-region in the first region and along which the $j^{th}$ 360-degree panoramic video frame in the 360-degree panoramic video is shot, determine a second direction that forms a 90-degree included angle with the first direction, and capture, from the $j^{th}$ 360-degree panoramic video frame in the 360-degree panoramic video, a front image shot in the second direction and used to display the $i^{th}$ sub-region in the first region.

Figure 15:
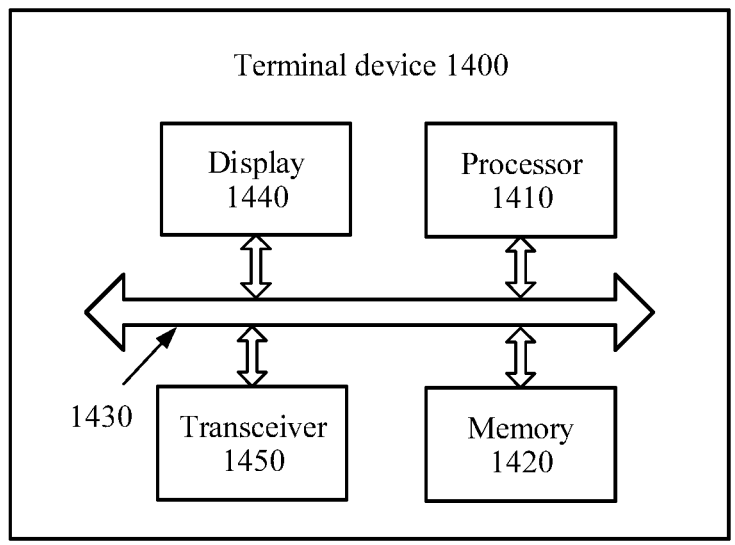
FIG. 15 is a schematic block diagram of a terminal device according to another embodiment of the present disclosure.

Optionally, in another embodiment, as shown in FIG. 15, the terminal device 1400 further includes a transceiver 1450. The processor 1410 is further configured to determine the identification information of the second object corresponding to the identification information of the first object after obtaining the identification information of the first object. The transceiver 1450 is configured to send first request information to a server to request the second object, where the first request information includes the identification information of the second object, and receive the second object sent by the server.

Optionally, in another embodiment, the transceiver 1450 is configured to send second request information to a server to request the second object after obtaining the identification information of the first object, where the second request information includes the identification information of the first object such that the server determines the identification information of the second object according to the identification information of the first object, and determines the second object according to the identification information of the second object, and receive the second object sent by the server.

Optionally, in another embodiment, the first object is the first 360-degree panorama, and the second object is the first strip panorama. After a switching instruction for switching the displayed first 360-degree panorama to the first strip panorama is received, the processor 1410 is further configured to obtain display resolution of a device used to present the first strip panorama. The processor 1410 is further configured to obtain, according to the identification information of the first 360-degree panorama and the display resolution, multiple consecutive strip panoramas that include the first strip panorama, where the multiple strip panoramas form a second strip panorama of a second region in which the first region is located. The display 1440 is further configured to present the second strip panorama formed by splicing the multiple strip panoramas.

In this embodiment of the present disclosure, the identification information of the first object and the identification information of the second object may be denoted by time information or geographic location information of shooting the first 360-degree panorama.

It should be understood that the terminal device 1400 according to this embodiment of the present disclosure may be corresponding to the terminal device in the image presentation method in the embodiments of the present disclosure and the terminal device 800 according to the embodiment of the present disclosure, and the foregoing and other operations and/or functions of each module in the terminal device 1400 are used to implement corresponding procedures of the method 100 in FIG. 1. For brevity, details are not described herein.

Therefore, according to the terminal device in this embodiment of the present disclosure, a 360-degree panorama and a strip panorama can be flexibly switched according to a correspondence between identification information of the 360-degree panorama and identification information of the strip panorama such that visual experience of a user can be enriched.

Figure 16:
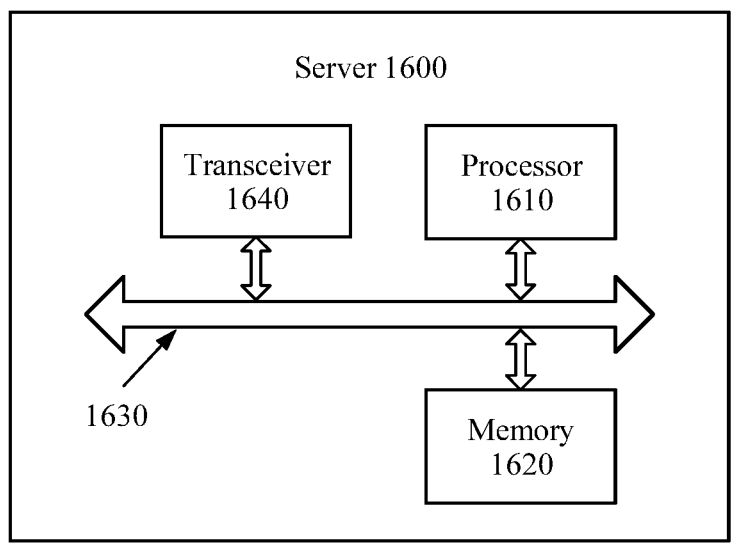
FIG. 16 is a schematic block diagram of a server according to another embodiment of the present disclosure.

FIG. 16 shows a schematic block diagram of a server 1600 according to another embodiment of the present disclosure. As shown in FIG. 16, the server 1600 includes a processor 1610, a memory 1620, a bus system 1630, and a transceiver 1640. The processor 1610, the memory 1620, and the transceiver 1640 are connected using the bus system 1630, the memory 1620 is configured to store an instruction, and the processor 1610 is used to execute, using the bus system 1630, the instruction stored in the memory 1620.

The transceiver 1640 is configured to receive request information sent by a terminal device and used for requesting a second object. The request information includes identification information of a first object, one of the first object or the second object is a first 360-degree panorama, the other one of the first object or the second object is a first strip panorama, the first strip panorama includes multiple front sub-images used to display a first region, an $i^{th}$ front sub-image in the multiple front sub-images corresponds to a front image in a $j^{th}$ 360-degree panorama in multiple 360-degree panoramas and displays an $i^{th}$ sub-region in the first region, the first 360-degree panorama is one of the multiple 360-degree panoramas, and i and j are positive integers. The processor 1610 is configured to determine, according to the identification information of the first object, identification information of the second object corresponding to the identification information of the first object, and determine the second object according to the identification information of the second object. The transceiver 1640 is further configured to send the second object to the terminal device such that the terminal device presents the second object.

Therefore, according to the server 1600 in this embodiment of the present disclosure, a 360-degree panorama or a strip panorama to which a terminal device is to be switched is sent to the terminal device according to a correspondence between identification information of the 360-degree panorama and identification information of the strip panorama such that the terminal device can flexibly switch between the 360-degree panorama and the strip panorama, and visual experience of a user can be enriched.

It should be understood that, in this embodiment of the present disclosure, the processor 1610 may be a CPU, or the processor 1610 may be another general purpose processor, a DSP, an ASIC, an FPGA or other programmable logical device, a discrete gate or transistor logical device, a discrete hardware assembly, or the like. The general-purpose processor may be a microprocessor, or the processor 1610 may be any conventional processor or the like.

The memory 1620 may include a ROM and a RAM, and provide an instruction and data for the processor 1610. A part of the memory 1620 may further include a non-volatile RAM. For example, the memory 1620 may further store device type information.

The bus system 1630 may include a power supply bus, a control bus, a status signal bus, and the like in addition to a data bus. However, for clarity, various types of buses in the figure are marked as the bus system 1630.

In an implementation process, the steps of the foregoing method may be implemented using an integrated logical circuit of hardware in the processor 1610, or an instruction in a form of software. The steps of the methods disclosed with reference to the embodiments of the present disclosure may be directly implemented by a hardware processor, or may be implemented by a combination of hardware and software modules in the processor 1610. The software module may be located in a storage medium mature in the art, such as a RAM, a flash memory, a ROM, a programmable ROM, or an electrically erasable programmable memory, or a register. The storage medium is located in the memory 1620, and the processor 1610 reads information in the memory 1620 and implements the steps of the foregoing methods in combination with hardware of the processor 1610. To avoid repetition, details are not described herein.

Optionally, in another embodiment, the multiple 360-degree panoramas are multiple 360-degree panoramic video frames in a 360-degree panoramic video, and the 360-degree panoramic video is shot using a 360-degree panoramic camera along an extension direction of a road on which the first region is located. The processor 1610 is further configured to obtain the 360-degree panoramic video before determining the second object corresponding to the identification information of the first object, where a $j^{th}$ 360-degree panoramic video frame in the multiple 360-degree panoramic video frames includes the front image used to display the $i^{th}$ sub-region in the first region, capture, from the $j^{th}$ 360-degree panoramic video frame in the multiple 360-degree panoramic video frames, the front image used to display the $i^{th}$ sub-region in the first region, splice, into the first strip panorama, front images that are captured from the multiple 360-degree panoramic video frames and used to display multiple sub-regions in the first region, and establish a correspondence between identification information of the first strip panorama and identification information of a first 360-degree panoramic video frame in the multiple 360-degree panoramic video frames.

In this embodiment of the present disclosure, the processor 1610 may be further configured to determine a first direction of the $i^{th}$ sub-region in the first region and along which the $j^{th}$ 360-degree panoramic video frame in the 360-degree panoramic video is shot, determine a second direction that forms a 90-degree included angle with the first direction, and capture, from the $j^{th}$ 360-degree panoramic video frame in the 360-degree panoramic video, a front image shot in the second direction and used to display the $i^{th}$ sub-region in the first region.

Optionally, in another embodiment, the first object is the first 360-degree panorama, the second object is the first strip panorama, and the request information further includes display resolution of the terminal device. The processor 1610 may be further configured to determine, according to the display resolution, multiple consecutive strip panoramas that include the first strip panorama after determining the first strip panorama corresponding to the identification information of the first strip panorama. The multiple strip panoramas form a second strip panorama of a second region in which the first region is located. The transceiver 1640 is further configured to send the multiple strip panoramas to the terminal device such that the terminal device presents the second strip panorama formed by splicing the multiple strip panoramas.

In this embodiment of the present disclosure, the identification information of the first object and the identification information of the second object are denoted by time information or geographic location information of shooting the first 360-degree panorama.

It should be understood that the server 1600 according to this embodiment of the present disclosure may be corresponding to the server in the image presentation method in the embodiments of the present disclosure and the server 1200 according to the embodiment of the present disclosure. The foregoing and other operations and/or functions of each module in the server 1600 are used to implement corresponding procedures of the method 200 in FIG. 2. For brevity, details are not described herein.

Therefore, according to the server in this embodiment of the present disclosure, a 360-degree panorama or a strip panorama to which a terminal device is to be switched is sent to the terminal device according to a correspondence between identification information of the 360-degree panorama and identification information of the strip panorama such that the terminal device can flexibly switch between the 360-degree panorama and the strip panorama, and visual experience of a user can be enriched.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image presentation method, comprising:
receiving a switching instruction to switch a displayed first object to a second object, wherein a first one of the first object or the second object is a first 360-degree panorama, wherein a second one of the first object or the second object is a first strip panorama;
obtaining identification information of the first object based on the switching instruction, wherein the first strip panorama comprises a plurality of front sub-images comprising a first region, wherein the first region comprises a plurality of sub-regions, wherein each sub-region comprises a front sub-image, wherein an $i^{th}$ front sub-image in the front sub-images corresponds to a first front image in a $j^{th}$ 360-degree panorama in a plurality of 360-degree panoramas and displays an $i^{th}$ sub-region in the first region, wherein an $i+1^{th}$ front sub-image in the front sub-images corresponds to a second front image of a different 360-degree panorama than the $i^{th}$ 360-degree panorama in the 360-degree panoramas, wherein the 360-degree panoramas comprises the first 360-degree panorama, and wherein i and j are positive integers;
obtaining, according to the identification information of the first object, the second object corresponding to the identification information of the first object, wherein the identification information of the first object corresponds to identification information of the second object; and
presenting the second object.

2. The method of claim 1, wherein after obtaining the identification information of the first object, the method further comprises:
determining the identification information of the second object corresponding to the identification information of the first object; and
sending first request information to a server to request the second object, wherein the first request information comprises the identification information of the second object, and
wherein obtaining the second object corresponding to the identification information of the first object comprises receiving the second object from the server.

3. The method of claim 1, wherein after obtaining the identification information of the first object, the method further comprises:
sending second request information to a server to request the second object, wherein the second request information comprises the identification information of the first object; and
receiving the second object from the server.

4. The method of claim 1, wherein obtaining the second object corresponding to the identification information of the first object comprises:
determining the identification information of the second object corresponding to the identification information of the first object; and
obtaining the second object according to the identification information of the second object.

5. The method of claim 4, wherein the 360-degree panoramas are a plurality of 360-degree panoramic video frames in a 360-degree panoramic video, wherein the 360-degree panoramic video is obtained using a 360-degree panoramic camera along an extension direction of a road on which the first region is located, and wherein before obtaining the identification information of the first object, the method further comprises:
obtaining the 360-degree panoramic video, wherein a $j^{th}$ 360-degree panoramic video frame in the 360-degree panoramic video frames comprises the first front image used to display the $i^{th}$ sub-region in the first region;

capturing, from the $j^{th}$ 360-degree panoramic video frame in the 360-degree panoramic video frames, the first front image used to display the $i^{th}$ sub-region in the first region;

splicing, into the first strip panorama, front images captured from the 360-degree panoramic video frames and used to display a plurality of sub-regions in the first region; and establishing a correspondence between identification information of the first strip panorama and identification information of a first 360-degree panoramic video frame in the 360-degree panoramic video frames.

6. The method of claim 5, wherein capturing the first front image used to display the $i^{th}$ sub-region in the first region comprises:

determining a first direction of the $i^{th}$ sub-region in the first region and along which the $j^{th}$ 360-degree panoramic video frame in the 360-degree panoramic video is obtained;

determining a second direction that forms a 90-degree included angle with the first direction; and capturing, from the $j^{th}$ 360-degree panoramic video frame in the 360-degree panoramic video, a front image obtained in the second direction, wherein the front image in the second direction is used to display the $i^{th}$ sub-region in the first region.

7. The method of claim 1, wherein the first object is the first 360-degree panorama, wherein the second object is the first strip panorama, wherein after the switching instruction for switching a displayed first 360-degree panorama to the first strip panorama is received, the method further comprises obtaining display resolution of a device used to present the first strip panorama, wherein obtaining the second object corresponding to the identification information of the first object comprises obtaining, according to the identification information of the first 360-degree panorama and the display resolution, a plurality of consecutive strip panoramas comprising the first strip panorama, wherein the consecutive strip panoramas form a second strip panorama of a second region in which the first region is located, and wherein presenting the second object comprises presenting, according to identification information of a plurality of strip panoramas, the second strip panorama formed by splicing the consecutive strip panoramas.

8. The method of claim 1, wherein the identification information of the first object and the identification information of the second object are denoted by time information or geographic location information of obtaining the first 360-degree panorama.

9. An image presentation method, comprising:

receiving request information from a terminal device that requests a second object, wherein the request information comprises identification information of a first object, wherein a first one of the first object or the second object is a first 360-degree panorama, wherein a second one of the first object or the second object is a first strip panorama, wherein the first strip panorama comprises a plurality of front sub-images comprising a first region, wherein the first region comprises a plurality of sub-regions, wherein each sub-region comprises a front sub-image, wherein an $i^{th}$ front sub-image in the front sub-images corresponds to a first front image in a $j^{th}$ 360-degree panorama in a plurality of 360-degree panoramas and displays an $i^{th}$ sub-region in the first region, wherein an $i+1^{th}$ front sub-image in the front sub-images corresponds to a second front image of a different 360-degree panorama than the $i^{th}$ 360-degree panorama in the 360-degree panoramas, wherein the 360-degree panoramas comprises the first 360-degree panorama, and wherein i and j are positive integers;

determining, according to the identification information of the first object, identification information of the second object corresponding to the identification information of the first object;

determining the second object according to the identification information of the second object; and sending the second object to the terminal device such that the terminal device presents the second object.

10. The method of claim 9, wherein the plurality of 360-degree panoramas are a plurality of 360-degree panoramic video frames in a 360-degree panoramic video, wherein the 360-degree panoramic video is obtained using a 360-degree panoramic camera along an extension direction of a road on which the first region is located, and wherein before determining the identification information of the second object corresponding to the identification information of the first object, the method further comprises:

obtaining the 360-degree panoramic video, wherein a $j^{th}$ 360-degree panoramic video frame in the 360-degree panoramic video frames comprises the first front image used to display the $i^{th}$ sub-region in the first region;

capturing, from the $j^{th}$ 360-degree panoramic video frame in the 360-degree panoramic video frames, the front image used to display the $i^{th}$ sub-region in the first region;

splicing, into the first strip panorama, front images captured from the 360-degree panoramic video frames and used to display a plurality of sub-regions in the first region; and establishing a correspondence between identification information of the first strip panorama and identification information of a first 360-degree panoramic video frame in the 360-degree panoramic video frames.

11. The method of claim 10, wherein capturing the first front image used to display the $i^{th}$ sub-region in the first region comprises:

determining a first direction of the $i^{th}$ sub-region in the first region and along which the $j^{th}$ 360-degree panoramic video frame in the 360-degree panoramic video is obtained;

determining a second direction that forms a 90-degree included angle with the first direction; and capturing, from the $j^{th}$ 360-degree panoramic video frame in the 360-degree panoramic video, a front image obtained in the second direction, wherein the front image in the second direction is used to display the $i^{th}$ sub-region in the first region.

12. The method of claim 9, wherein the first object is the first 360-degree panorama, wherein the second object is the first strip panorama, wherein the request information further comprises display resolution of the terminal device, wherein after the first strip panorama corresponding to identification information of the first strip panorama is determined, the method further comprises determining, according to the display resolution, a plurality of consecutive strip panoramas comprising the first strip panorama, wherein the consecutive strip panoramas form a second strip panorama of a second region in which the first region is located, and wherein sending the second object to the terminal device comprises sending the consecutive strip panoramas to the terminal device such that the terminal device presents the second strip panorama formed by splicing the consecutive strip panoramas.

13. The method of claim 9, wherein the identification information of the first object and the identification information of the second object are denoted by time information or geographic location information of obtaining the first 360-degree panorama.

14. A terminal device, comprising:
a memory comprising instructions; and
a processor coupled to the memory and configured to execute the instructions, wherein the instructions cause the processor to be configured to:
receive a switching instruction to switch a displayed first object to a second object, wherein a first one of the first object or the second object is a first 360-degree panorama, wherein a second one of the first object or the second object is a first strip panorama;
obtain identification information of the first object based on the switching instruction, wherein the first strip panorama comprises a plurality of front sub-images comprising a first region, wherein the first region comprises a plurality of sub-regions, wherein each sub-region comprises a front sub-image, wherein an $i^{th}$ front sub-image in the front sub-images corresponds to a first front image in a $j^{th}$ 360-degree panorama in a plurality of 360-degree panoramas and displays an $i^{th}$ sub-region in the first region, wherein an $i+1^{th}$ front sub-image in the front sub-images corresponds to a second front image of a different 360-degree panorama than the $i^{th}$ 360-degree panorama in the 360-degree panoramas, wherein the 360-degree panorama comprises one of the first 360-degree panorama, and wherein i and j are positive integers;
obtain, according to the identification information of the first object, the second object corresponding to the identification information of the first object, wherein the identification information of the first object corresponds to identification information of the second object; and
present the second object.

15. The terminal device of claim 14, wherein the instructions further cause the processor to be configured to:
determine the identification information of the second object corresponding to the identification information of the first object after obtaining the identification information of the first object;
send first request information to a server to request the second object, wherein the first request information comprises the identification information of the second object; and
receive the second object from the server.

16. The terminal device of claim 14, wherein the instructions further cause the processor to be configured to:
send second request information to a server to request the second object after obtaining the identification information of the first object, wherein the second request information comprises the identification information of the first object; and
receive the second object sent by the server.

17. The terminal device of claim 14, wherein the instructions further cause the processor to be configured to:
determine the identification information of the second object corresponding to the identification information of the first object; and obtain the second object according to the identification information of the second object.

18. The terminal device of claim 17, wherein the 360-degree panoramas are a plurality of 360-degree panoramic video frames in a 360-degree panoramic video, wherein the 360-degree panoramic video is obtained using a 360-degree panoramic camera along an extension direction of a road on which the first region is located, and wherein the instructions further cause the processor to be configured to:
obtain the 360-degree panoramic video before obtaining the identification information of the first object, wherein a $j^{th}$ 360-degree panoramic video frame in the 360-degree panoramic video frames comprises the first front image used to display the $i^{th}$ sub-region in the first region;
capture, from the $j^{th}$ 360-degree panoramic video frame in the 360-degree panoramic video frames, the first front image used to display the $i^{th}$ sub-region in the first region;
splice, into the first strip panorama, front images captured from the plurality of 360-degree panoramic video frames and used to display a plurality of sub-regions in the first region; and
establish a correspondence between identification information of the first strip panorama and identification information of a first 360-degree panoramic video frame in the 360-degree panoramic video frames.

19. The terminal device of claim 18, wherein the instructions further cause the processor to be configured to:
determine a first direction of the $i^{th}$ sub-region in the first region and along which the $j^{th}$ 360-degree panoramic video frame in the 360-degree panoramic video is obtained;
determine a second direction that forms a 90-degree included angle with the first direction; and
capture, from the $j^{th}$ 360-degree panoramic video frame in the 360-degree panoramic video, a front image obtained in the second direction, wherein the front image in the second direction is displays the $i^{th}$ sub-region in the first region.

20. The terminal device of claim 14, wherein the first object is the first 360-degree panorama, wherein the second object is the first strip panorama, and wherein the instructions further cause the processor to be configured to:
obtain display resolution of a device used to present the first strip panorama after the switching instruction for switching a displayed first 360-degree panorama to the first strip panorama is received;
obtain, according to the identification information of the first 360-degree panorama and the display resolution, a plurality of consecutive strip panoramas comprising the first strip panorama, wherein the consecutive strip panoramas form a second strip panorama of a second region in which the first region is located; and
present, according to identification information of the consecutive strip panoramas, the second strip panorama formed by splicing the consecutive strip panoramas.

21. The terminal device of claim 14, wherein the identification information of the first object and the identification information of the second object are denoted by time information or geographic location information of obtaining the first 360-degree panorama.

22. A server, comprising:
a receiver configured to receive request information from a terminal device that requests a second object, wherein the request information comprises identification information of a first object, wherein a first one of the first object or the second object is a first 360-degree panorama, wherein a second one of the first object or the second object is a first strip panorama, wherein the first strip panorama comprises a plurality of front sub-images comprising a first region, wherein the first region comprises a plurality of sub-regions, wherein each sub-region comprises a front sub-image, wherein an $i^{th}$ front sub-image in the front sub-images corresponds to a first front image in a $j^{th}$ 360-degree panorama in a plurality of 360-degree panoramas and displays an $i^{th}$ sub-region in the first region, wherein an $i+1^{th}$ front sub-image in the front sub-images corresponds to a second front image of a different 360-degree panorama than the $i^{th}$ 360-degree panorama in the 360-degree panoramas, wherein the 360-degree panoramas comprises the first 360-degree panorama, and wherein i and j are positive integers;

a processor coupled to the receiver and configured to:
 determine, according to the identification information of the first object, identification information of the second object corresponding to the identification information of the first object; and
 determine the second object according to the identification information of the second object; and a transmitter coupled to the processor and configured to send the second object to the terminal device such that the terminal device presents the second object.

23. The server of claim 22, wherein the plurality of 360-degree panoramas are a plurality of 360-degree panoramic video frames in a 360-degree panoramic video, wherein the 360-degree panoramic video is obtained using a 360-degree panoramic camera along an extension direction of a road on which the first region is located, and wherein the processor is further configured to: obtain the 360-degree panoramic video before determining the identification information of the second object corresponding to the identification information of the first object, wherein a $j^{th}$ 360-degree panoramic video frame in the plurality of 360-degree panoramic video frames comprises the front image used to display the $i^{th}$ sub-region in the first region;

capture, from the $j^{th}$ 360-degree panoramic video frame in the 360-degree panoramic video frames, the front image used to display the $i^{th}$ sub-region in the first region;

splice, into the first strip panorama, front images captured from the 360-degree panoramic video frames and used to display a plurality of sub-regions in the first region; and establish a correspondence between identification information of the first strip panorama and identification information of a first 360-degree panoramic video frame in the 360-degree panoramic video frames.

24. The server of claim 23, wherein the processor is further configured to:
 determine a first direction of the $i^{th}$ sub-region in the first region and along which the $j^{th}$ 360-degree panoramic video frame in the 360-degree panoramic video is obtained;
 determine a second direction that forms a 90-degree included angle with the first direction; and
 capture, from the $j^{th}$ 360-degree panoramic video frame in the 360-degree panoramic video, a front image obtained in the second direction, wherein the front image in the second direction is used to display the $i^{th}$ sub-region in the first region.

25. The server of claim 22, wherein the first object is the first 360-degree panorama, wherein the second object is the first strip panorama, wherein the request information further comprises display resolution of the terminal device, wherein the processor is further configured to determine, according to the display resolution, a plurality of consecutive strip panoramas comprising the first strip panorama after determining the first strip panorama corresponding to identification information of the first strip panorama, wherein the consecutive strip panoramas form a second strip panorama of a second region in which the first region is located, and wherein the transmitter is further configured to send the consecutive strip panoramas to the terminal device such that the terminal device presents the second strip panorama formed by splicing the consecutive strip panoramas.

26. The server of claim 22, wherein the identification information of the first object and the identification information of the second object are denoted by time information or geographic location information of obtaining the first 360-degree panorama.

\* \* \* \* \*